(12) United States Patent
Sonoda

(10) Patent No.: US 7,611,067 B2
(45) Date of Patent: Nov. 3, 2009

(54) PRINTED MATERIAL WITH IDENTIFICATION FUNCTION, IMAGE GENERATING APPARATUS, IMAGE PROCESSING APPARATUS, IMAGE GENERATING METHOD, IMAGE PROCESSING METHOD, AND PROGRAM PRODUCT THEREFOR

(75) Inventor: Takashi Sonoda, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 187 days.

(21) Appl. No.: 11/507,572

(22) Filed: Aug. 22, 2006

(65) Prior Publication Data

US 2007/0199990 A1 Aug. 30, 2007

(30) Foreign Application Priority Data

Feb. 24, 2006 (JP) ............................. 2006-049117

(51) Int. Cl.
*G06K 19/06* (2006.01)
(52) U.S. Cl. ...................................... 235/494; 235/454
(58) Field of Classification Search ................. 235/454, 235/494; 345/179; 382/284
See application file for complete search history.

(56) References Cited

U.S. PATENT DOCUMENTS

| 6,186,405 B1* | 2/2001 | Yoshioka ..................... 235/494 |
| 2007/0023523 A1* | 2/2007 | Onishi ........................ 235/454 |

FOREIGN PATENT DOCUMENTS

| JP | B2 2833975 | 8/1994 |
| JP | A 9-185669 | 7/1997 |
| JP | A 2003-511762 | 3/2003 |
| JP | A 2004-152273 | 5/2004 |
| WO | WO 01/26033 A1 | 4/2001 |

* cited by examiner

*Primary Examiner*—Kumiko C Koyama
(74) *Attorney, Agent, or Firm*—Oliff & Berridge, PLC

(57) ABSTRACT

A printed material includes a first coded pattern of image identification information repeatedly formed on a recording material, and a second coded pattern of a coordinate value on the recording material recorded as a background image. The first coded pattern and the second coded pattern are provided to identify an image formed on the recording material, and the first coded pattern represents a second pattern value, on the basis of a value obtained by adding a third pattern value to a first pattern value, the third pattern value being obtained by encoding the coordinate value, the first pattern value being obtained by encoding the image identification information.

12 Claims, 30 Drawing Sheets

9C2 METHOD
2 DOTS ARRANGED IN 9 DOT AREAS

DENSITY
5.56%

INFORMATION AMOUNT
0.036bit/pixel

12 PIXELS

INFORMATION AMOUNT IS ALMOST EQUAL TO OF BENCHMARK, BUT DENSITY IS MORE FAVORABLE

FIG. 2A    RELATED ART
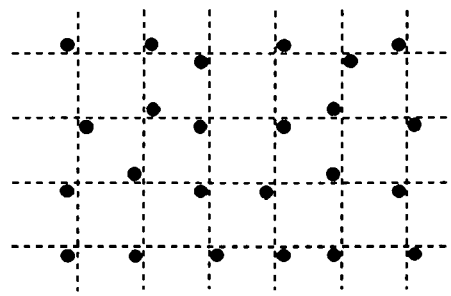
FIG. 2B    RELATED ART
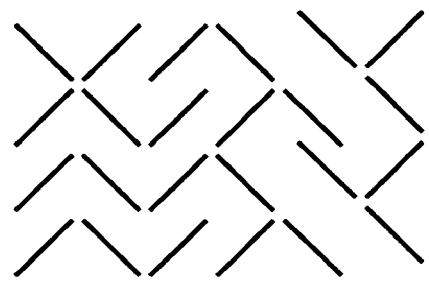
FIG. 2C    RELATED ART
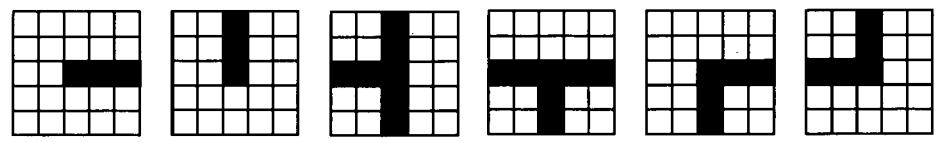
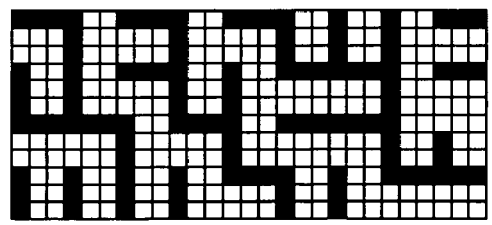
FIG. 2D    RELATED ART
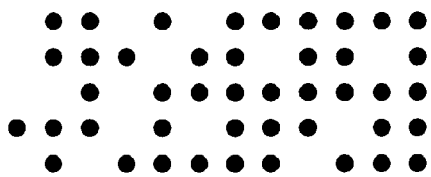

9C2 METHOD
2 DOTS ARRANGED IN 9 DOT AREAS

DENSITY 5.56%
INFORMATION AMOUNT 0.036bit/pixel

12 PIXELS

INFORMATION AMOUNT IS ALMOST EQUAL TO OF BENCHMARK, BUT DENSITY IS MORE FAVORABLE

9C3 METHOD
3 DOTS ARRANGED IN 9 DOT AREAS

DENSITY 8.33%
INFORMATION AMOUNT 0.071bit/pixel

12 PIXELS

DENSITY IS ALMOST EQUAL TO OF BENCHMARK, BUT INFORMATION AMOUNT IS LARGER

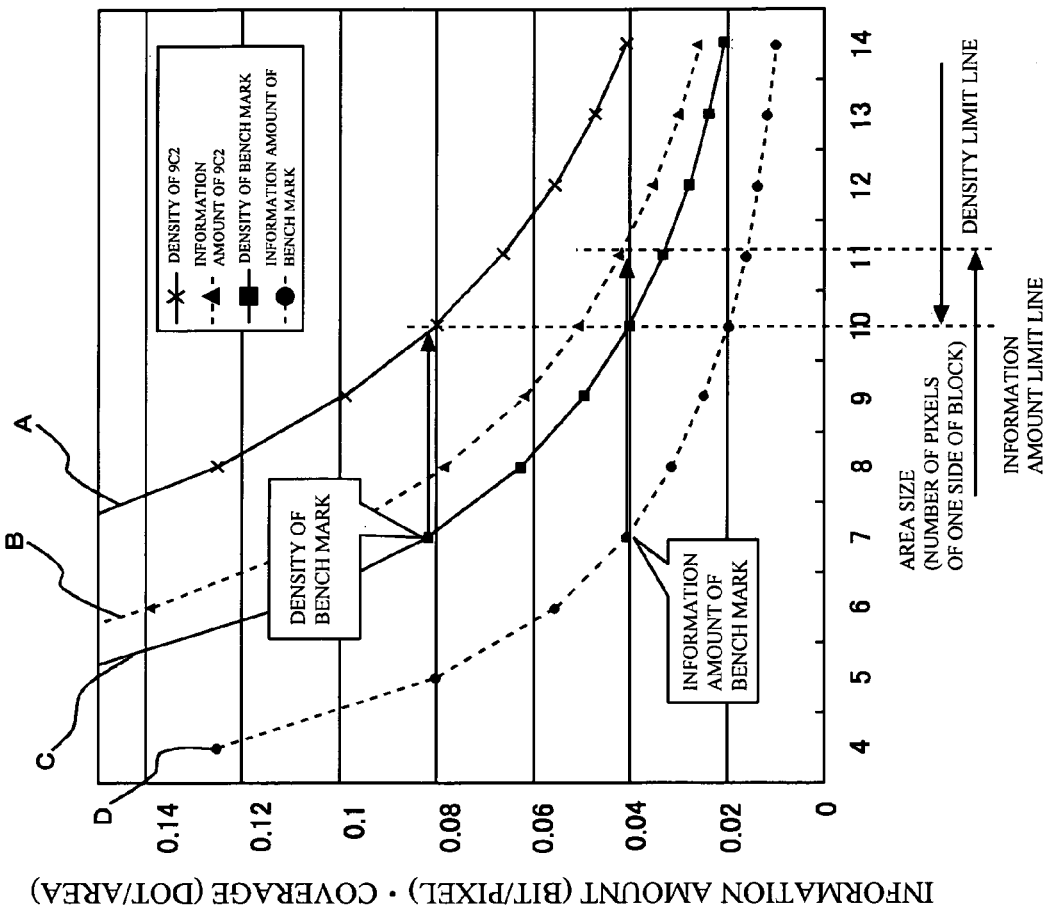
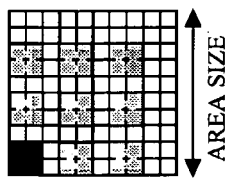
FIG. 7

FIG. 10A — COMPARISON OF DENSITY

| TOTAL NUMBER OF DOTS | 4 | 4 | 6 | 6 | 6 | 9 | 9 | 9 | 9 |
|---|---|---|---|---|---|---|---|---|---|
| INFORMATION DOT | 1 | 2 | 1 | 2 | 3 | 1 | 2 | 3 | 4 |
| AREA SIZE 4 | 0.250 | 0.500 | 0.250 | 0.500 | 0.750 | 0.250 | 0.500 | 0.750 | 1.000 |
| 5 | 0.160 | 0.320 | 0.160 | 0.320 | 0.480 | 0.160 | 0.320 | 0.480 | 0.640 |
| 6 | 0.111 | 0.222 | 0.111 | 0.222 | 0.333 | 0.111 | 0.222 | 0.333 | 0.444 |
| 7 | 0.082 | 0.163 | ■ | 0.163 | 0.245 | ■ | 0.163 | 0.245 | 0.327 |
| 8 | ■ | 0.125 | ■ | 0.125 | 0.188 | ■ | 0.125 | 0.188 | 0.250 |
| 9 | ■ | 0.099 | ■ | 0.099 | 0.148 | ■ | 0.099 | 0.148 | 0.198 |
| 10 | ■ | ■ | ■ | ■ | 0.120 | ■ | ■ | 0.120 | 0.160 |
| 11 | ■ | ■ | ■ | ■ | 0.099 | ■ | ■ | 0.099 | 0.132 |
| 12 | ■ | ■ | ■ | ■ | 0.083 | ■ | ■ | 0.083 | 0.111 |
| 13 | ■ | ■ | ■ | ■ | ■ | ■ | ■ | ■ | 0.095 |
| 14 | ■ | ■ | ■ | ■ | ■ | ■ | ■ | ■ | ■ |

FIG. 10B — COMPARISON OF INFORMATION AMOUNT

| TOTAL NUMBER OF DOTS | 4 | 4 | 6 | 6 | 6 | 9 | 9 | 9 | 9 |
|---|---|---|---|---|---|---|---|---|---|
| INFORMATION DOT | 1 | 2 | 1 | 2 | 3 | 1 | 2 | 3 | 4 |
| AREA SIZE 4 | ■ | ■ | ■ | ■ | ■ | ■ | ■ | ■ | ■ |
| 5 | ■ | ■ | ■ | ■ | ■ | ■ | ■ | ■ | ■ |
| 6 | ■ | ■ | ■ | ■ | ■ | ■ | ■ | ■ | ■ |
| 7 | 0.041 | ■ | ■ | ■ | ■ | ■ | ■ | ■ | ■ |
| 8 | 0.031 | 0.040 | ■ | 0.040 | ■ | ■ | ■ | ■ | ■ |
| 9 | 0.025 | 0.032 | ■ | 0.032 | 0.039 | ■ | ■ | ■ | ■ |
| 10 | 0.020 | 0.026 | ■ | 0.026 | 0.032 | 0.039 | 0.036 | ■ | ■ |
| 11 | 0.017 | 0.021 | ■ | 0.021 | 0.027 | 0.032 | 0.030 | ■ | ■ |
| 12 | 0.014 | 0.018 | ■ | 0.018 | 0.023 | 0.026 | 0.026 | 0.031 | 0.036 |
| 13 | 0.012 | 0.015 | ■ | 0.015 | 0.020 | 0.022 | 0.022 | 0.026 | 0.038 |
| 14 | 0.010 | 0.013 | ■ | 0.013 | 0.016 | 0.019 | 0.020 | 0.033 | 0.036 |

FIG. 11

COMPARISON OF DENSITY AND INFORMATION AMOUNT

| TOTAL NUMBER OF DOTS | 4 | 4 | 6 | 6 | 6 | 9 | 9 | 9 | 9 |
|---|---|---|---|---|---|---|---|---|---|
| INFORMATION DOT | 1 | 2 | 1 | 2 | 3 | 1 | 2 | 3 | 4 |
| 4 | | | | | | | | | |
| 5 | | | | | | | | | |
| 6 | | | | | | | | | |
| 7 | BENCH MARK | PICK 1 | | | | | | | |
| 8 | | | | | PICK 2 | | | | |
| 9 | | | | | PICK 3 | | | | |
| 10 | | | | | | | PICK 4 | | |
| 11 | | | | | | | PICK 5 | | |
| 12 | | | | | | | PICK 6 | | |
| 13 | | | | | | | | PICK 7 | |
| 14 | | | | | | | | | |

AREA SIZE

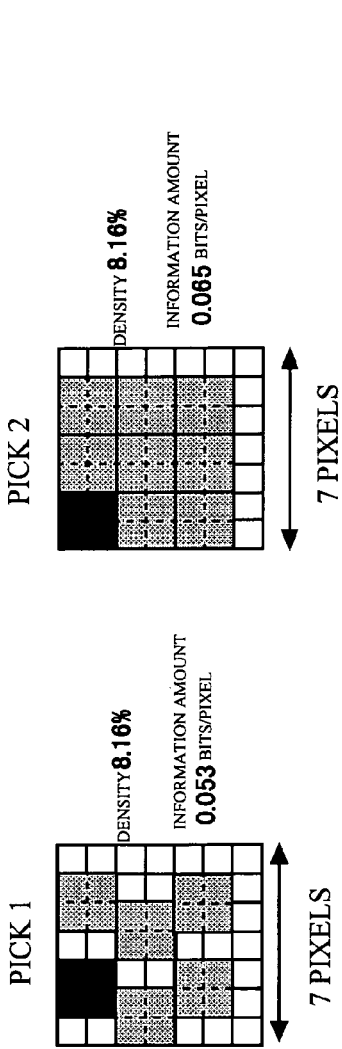
FIG. 12A BENCH MARK
FIG. 12B PICK 1
FIG. 12C PICK 2
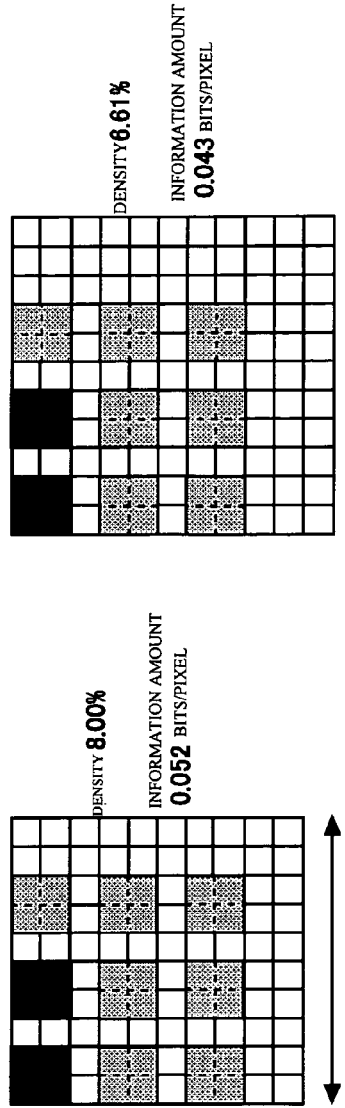
FIG. 12D PICK 3
FIG. 12E PICK 4
FIG. 12F PICK 5

SEARCH SYNCHRONOUS CODE PATTERN
UNITS 32 TO 35. WHEN PATTERN 35 IS DETECTED,
IT IS FOUND THAT THE PATTERN IS ROTATED
270 DEG RIGHTWARD

ROTATE IMAGE 90 DEG
RIGHTWARD
AND SORT PATTERN
NUMBERS

DECODING

M-SEQUENCE CODE  0 1 1 1 0 0 0 1 0 1 0 1 1 0 1 0 0 0 0 1 1 0 0 1 0

CODE PATTERN UNIT

FIG. 20A  INPUT INFORMATION  ex465813211
FIG. 20B  BINARY EXPRESSION  1 1 0 1 0 0 1 1 1 1 1 0 1 0 0 1 1 1 0 0 0 0 1 1 1 1 0 · · · ·
FIG. 20C  RS CODE  10  2  23  15  6  18  28  25  6  12  14  9 · · · ·
FIG. 20D  MANY VALUED EXPRESSION (GALOIS FIELD)  28    25    6    12    14

FIG. 20E  CODE PATTERN

FIG. 22

| 32 | 5 | 13 | (10) | 3 |
|---|---|---|---|---|
| 7 | 29 | 1 | 14 | 10 |
| (15) | 5 | 23 | (26) | 1 |
| 1 | 21 | 0 | 0 | 0 |
| 4 | 0 | 0 | 0 | 0 |

| 32 | 13 | 7 | 15 | 7 | 32 | 0 | 6 | 1 | 5 | 32 | 5 | 13 | 10 | 3 |
|---|---|---|---|---|---|---|---|---|---|---|---|---|---|---|
| 10 | 20 | 18 | 7 | 27 | 10 | 7 | 17 | 25 | 25 | 10 | 12 | 24 | 2 | 23 |
| 2 | 20 | 0 | 11 | 10 | 2 | 7 | 31 | 29 | 8 | 2 | 12 | 6 | 6 | 6 |
| 7 | 9 | 14 | 22 | 14 | 7 | 28 | 13 | 8 | 12 | 7 | 1 | 20 | 17 | 10 |
| 0 | 13 | 7 | 15 | 7 | 0 | 0 | 6 | 1 | 5 | 0 | 5 | 13 | 10 | 3 |
| 32 | 13 | 7 | 15 | 7 | 32 | 0 | 6 | 1 | 5 | 32 | 5 | 13 | 10 | 3 |
| 15 | 25 | 23 | 12 | 0 | 15 | 12 | 22 | 30 | 30 | 15 | 17 | 29 | 7 | 28 |
| 7 | 25 | 5 | 16 | 15 | 7 | 12 | 4 | 2 | 13 | 7 | 17 | 11 | 11 | 11 |
| 5 | 7 | 12 | 20 | 12 | 5 | 26 | 11 | 6 | 10 | 5 | 31 | 18 | 15 | 8 |
| 8 | 21 | 15 | 23 | 15 | 8 | 8 | 13 | 9 | 13 | 8 | 13 | 21 | 18 | 11 |
| 32 | 13 | 7 | 15 | 7 | 32 | 0 | 6 | 1 | 5 | 32 | 5 | 13 | 10 | 3 |
| 7 | 17 | 15 | 4 | 24 | 7 | 4 | 14 | 22 | 22 | 7 | 9 | 21 | 31 | 20 |
| 15 | 1 | 3 | 25 | 23 | 15 | 15 | 12 | 10 | 21 | 15 | 25 | 19 | 19 | 19 |
| 1 | 3 | 8 | 16 | 8 | 1 | 22 | 7 | 2 | 23 | 1 | 27 | 14 | 11 | 4 |
| 4 | 17 | 11 | 19 | 11 | 4 | 4 | 10 | 5 | 9 | 4 | 9 | 17 | 14 | 7 |

X COORDINATE VALUE BLOCK

| 5 | 13 | 10 | 3 |

+

0  16  16  0

X COORDINATE VALUE BLOCK

| 5 | 29 | 26 | 3 |

PRINTED MATERIAL WITH IDENTIFICATION FUNCTION, IMAGE GENERATING APPARATUS, IMAGE PROCESSING APPARATUS, IMAGE GENERATING METHOD, IMAGE PROCESSING METHOD, AND PROGRAM PRODUCT THEREFOR

BACKGROUND

1. Technical Field

The present invention relates to a technology for reading part of a code pattern uniformly arranged on a two dimensional surface and identifying a reading position on the two-dimensional surface.

2. Related Art

In these years, a technology for uniformly arranging a code pattern on a two dimensional surface, reading a symbol thereof, and identifying a position on the two dimensional surface has been proposed. For example, symbols are uniformly printed on an examination sheet printed on paper or the like in invisible ink or toner having infrared or ultraviolet absorption characteristic. When an answerer goes over the selected answer position by a scanner or the like, the selected answer is sent to a correspondence school or the like (refer to FIG. 1). The symbols can be printed invisible ink in addition to the invisible ink.

As such a code pattern, various patterns have been proposed. For example, as shown in FIG. 2A, a virtual grid is arranged, and a dot is arranged in one of four areas defined by an intersection of the grid. Thereby, four types of patterns can be expressed, and 2 bits can be expressed. The code pattern will be hereinafter refereed to as benchmark.

As shown in FIG. 2B, 1 bit is expressed by a right oblique straight lines and left oblique straight lines, which is called glyph code. As shown in FIG. 2C, information is expressed by a combination of straight line and key-shaped graphic patterns. As shown in FIG. 2D, information is expressed by ON/OFF of dots.

SUMMARY

An aspect of the present invention provides a printed material including: a first coded pattern of image identification information repeatedly formed on a recording material; and a second coded pattern of a coordinate value on the recording material recorded as a background image. The first coded pattern and the second coded pattern are provided to identify an image formed on the recording material, and the first coded pattern represents a second pattern value, on the basis of a value obtained by adding a third pattern value to a first pattern value, the third pattern value being obtained by encoding the coordinate value, the first pattern value being obtained by encoding the image identification information.

BRIEF DESCRIPTION OF THE DRAWINGS

Embodiments of the present invention will be described in detail based on the following figures, wherein:

FIGS. 2A, 2B, 2C, and 2D are views showing code patterns of related arts;

FIG. 7 is a diagram comparing information amounts and densities between a benchmark and 9C2 method;

FIGS. 10A and 10B are diagrams showing change in densities and information amounts when an area size and the number of dots are changed;

FIG. 11 is a diagram showing candidates of code patterns which have an information amount equal to or more than of the benchmark and whose density is lower than of the benchmark;

FIGS. 12A, 12B, 12C, 12D, 12E, and 12F are views showing code patterns of the invention;

FIGS. 20A, 20B, 20C, 20D, and 20E are views showing a procedure of coding image identification information;

FIG. 22 is a view showing a method of decreasing density unevenness of code patterns showing the image identification information;

FIG. 23 is a view showing pattern values of the image identification information after performing the method of decreasing density unevenness;

DETAILED DESCRIPTION

A description will now be given, with reference to the accompanying drawings, of exemplary embodiments of the invention.

EXEMPLARY EMBODIMENTS (Code Pattern)

Figure 1:
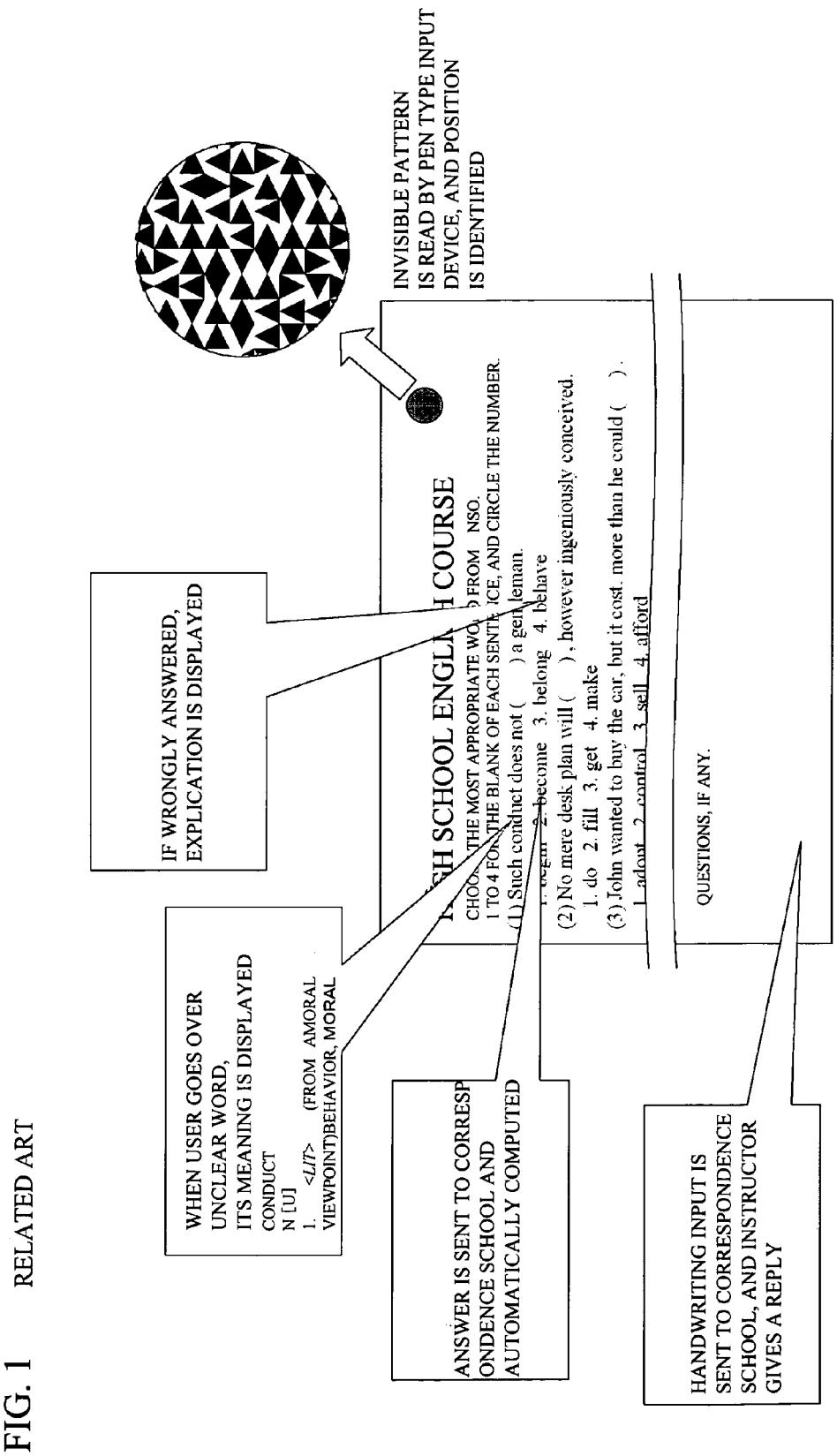
FIG. 1 is a view showing an example of utilizing a technology for identifying a reading position on a two dimensional surface.
Figure 3A:
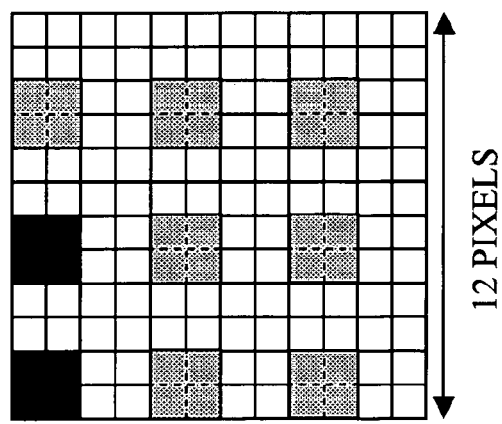
FIGS. 3A and 3B are views showing code patterns of the invention.
Figure 9:
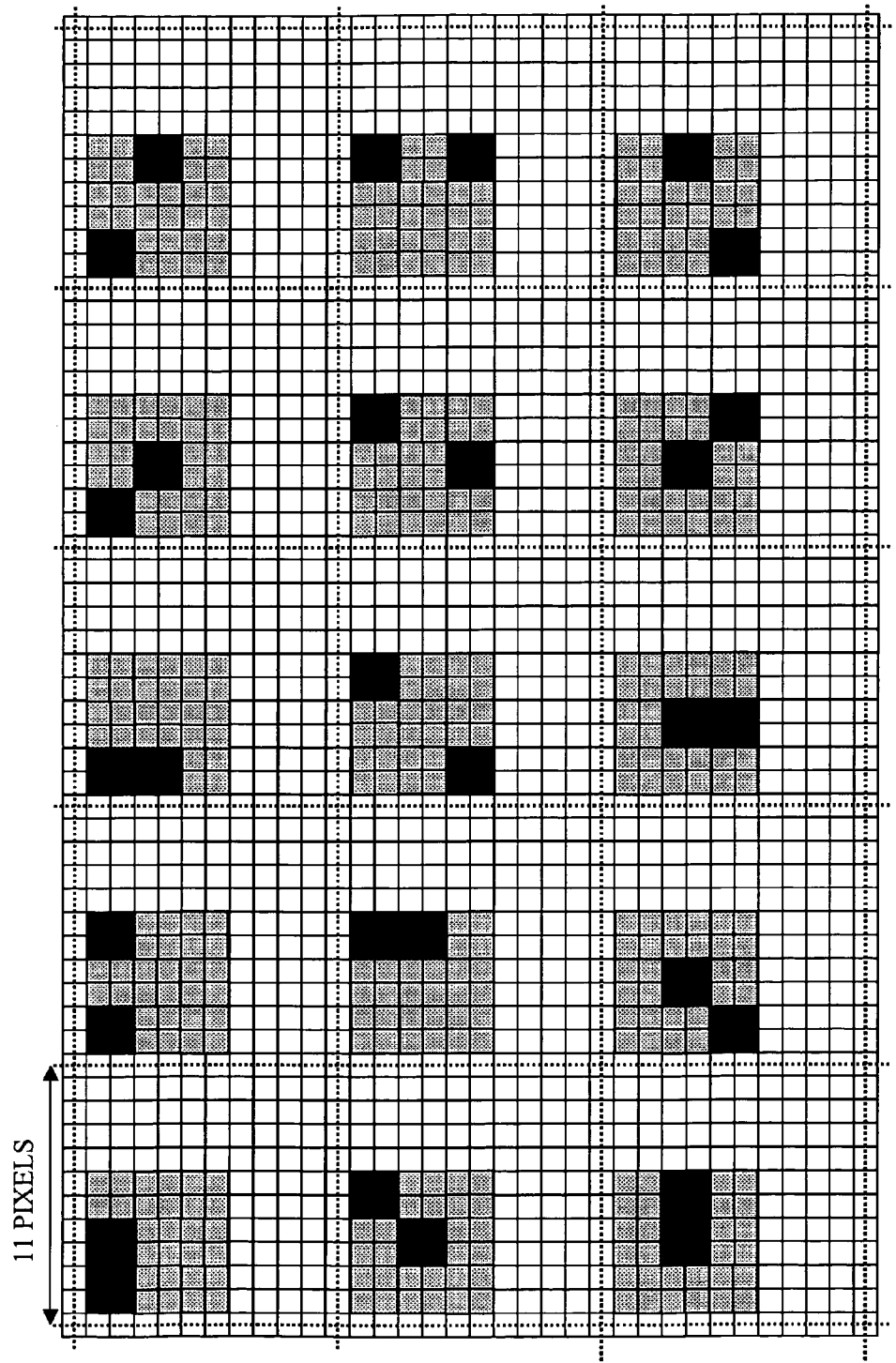
FIG. 9 is an arrangement example of code patterns of 9C2 method.

First, a description will be given of a structure of a code pattern. The code pattern is recorded as a background image on the sheet. The code pattern is formed from invisible ink or toner having infrared or ultraviolet absorption characteristic, in addition to from visible ink or toner. In the code pattern of this exemplary embodiment, as shown in FIG. 3A, 9-dot printing areas are provided in a 12×12 pixel block. Information is displayed by selecting 2-from the 9-dot printing areas. Selecting 2 from 9 results in 36 combinations. Therefore, calculating a log with a base of 2 results in about 5.17 bits. That is, one code pattern (symbol) can express about 5.17 bits.

$$_9C_2=36$$

$$\log_2 36 \approx 5.17 \quad \text{(Expression 1)}$$

Figure 4:
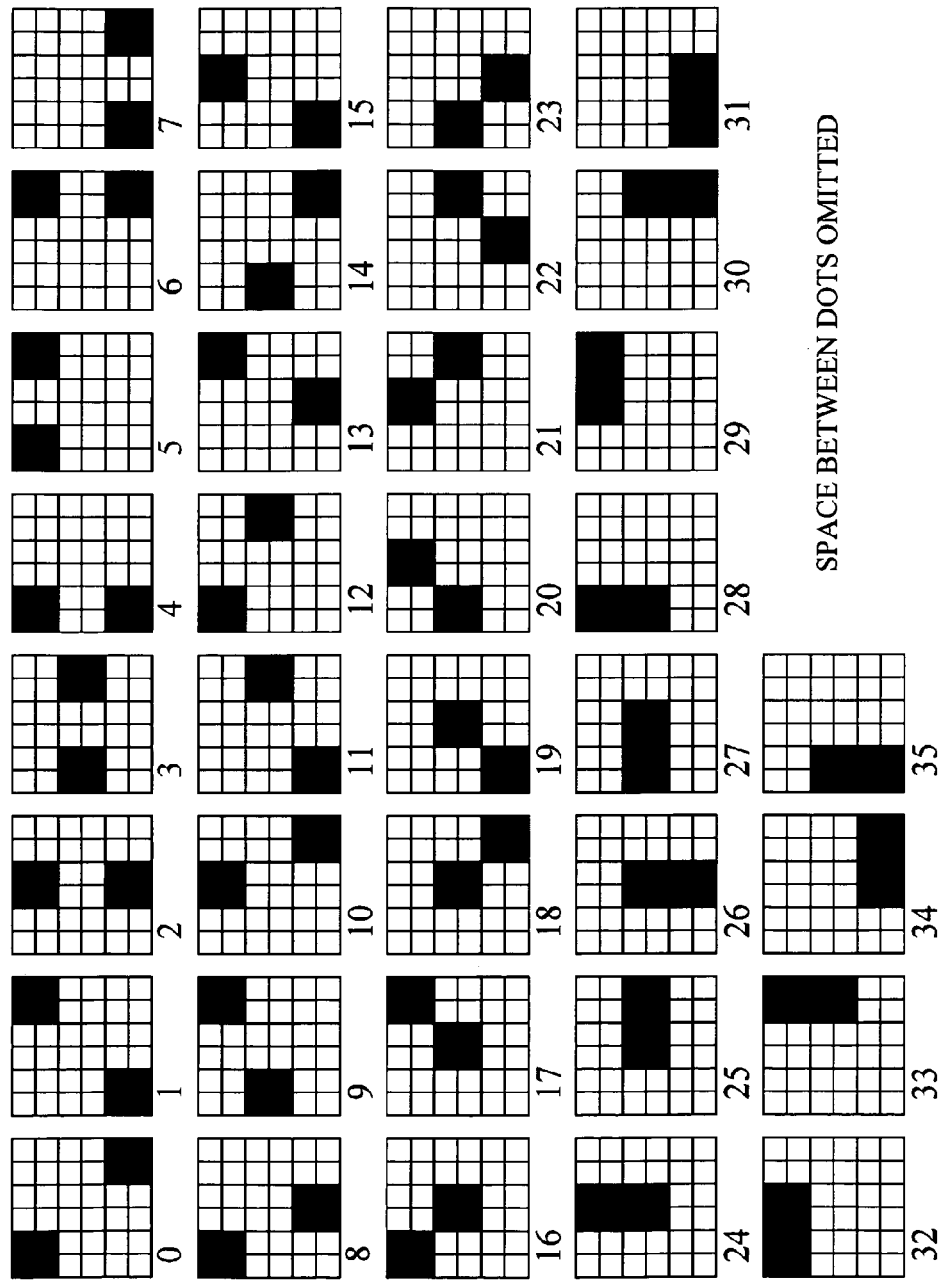
FIG. 4 is a view showing code patterns and pattern values of 9C2 method.
Figure 5:
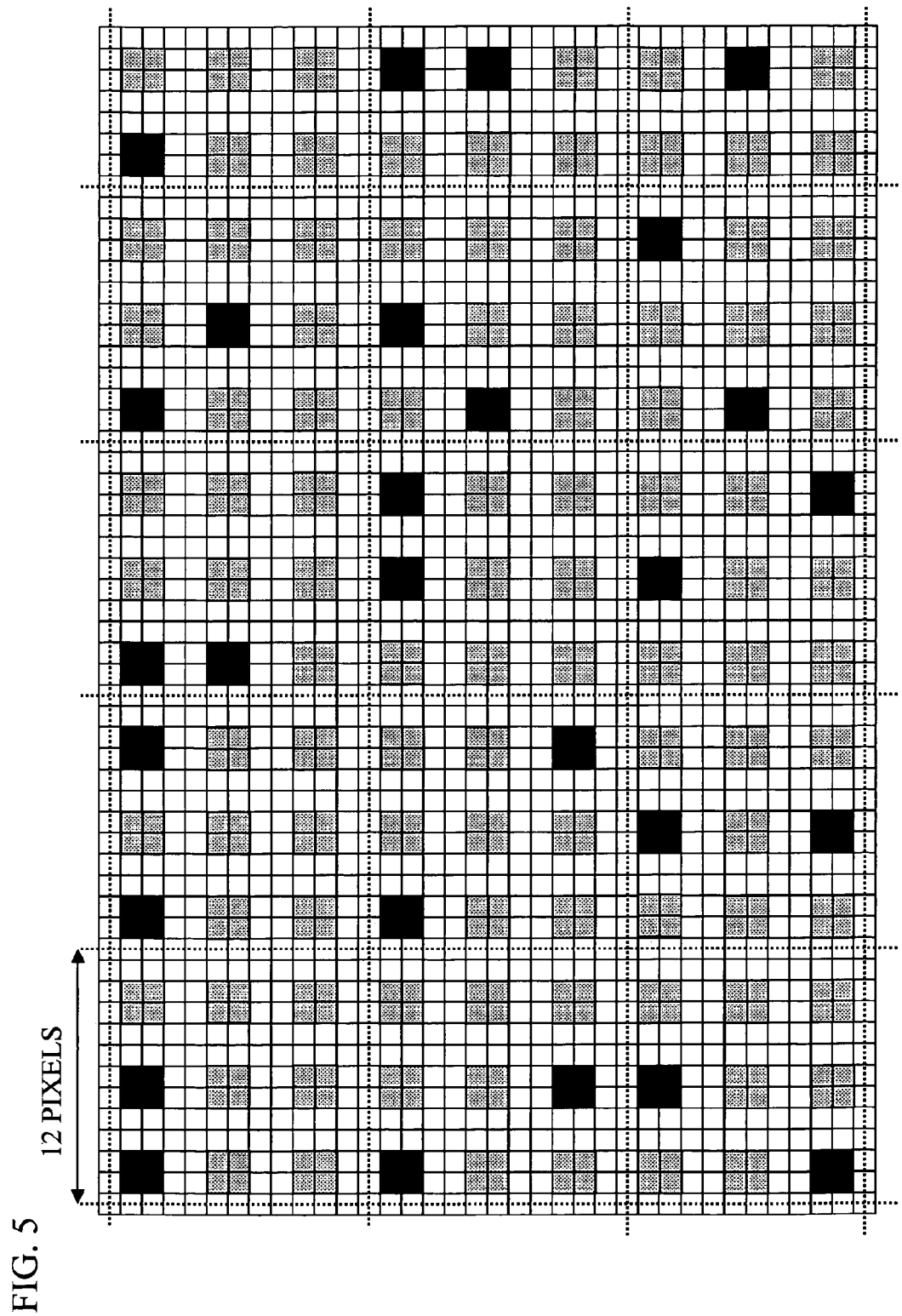
FIG. 5 is a view showing a state that the code patterns of 9C2 method are arranged.

Two-pixel space is provided between printing areas. When the code pattern is printed by a 1200DPI printer, each dot is appropriately composed of 2×2 pixels. The following description will be given of the case using this dot size. However, it is needless to say that the code pattern may be expressed by another dot size. In the code pattern, 2 pieces of 2×2=4 pixels are embedded in 12×12 pixels=144 pixels. Therefore, the density of 1 block becomes 5.56%. Further, the information amount becomes 0.036 bits/pixel resulting from 5.17/144. FIG. 4 shows code patterns obtained by selecting and combining 2 dots from 9-dot printing areas. The number shown under each block represents a pattern value inherent in each pattern. In FIG. 4, white spaces shown in FIG. 3A are omitted. The number of combinations of selecting 2 from 9 is denoted by mathematical characters, $_9C_2$. Therefore, such a code pattern will be hereinafter called 9C2 pattern. FIG. 5 shows an actual layout using the 9C2 patterns.

As described above, in the code pattern of this exemplary embodiment, a piece of information is expressed by multiple dots. Thereby, a code pattern which is inconspicuous and has a high information amount can be realized. Further, as shown in FIGS. 3A and 3B, since a space is provided between dots, errors can be reduced and the code pattern can be read accurately as long as possible.

Figure 3B:
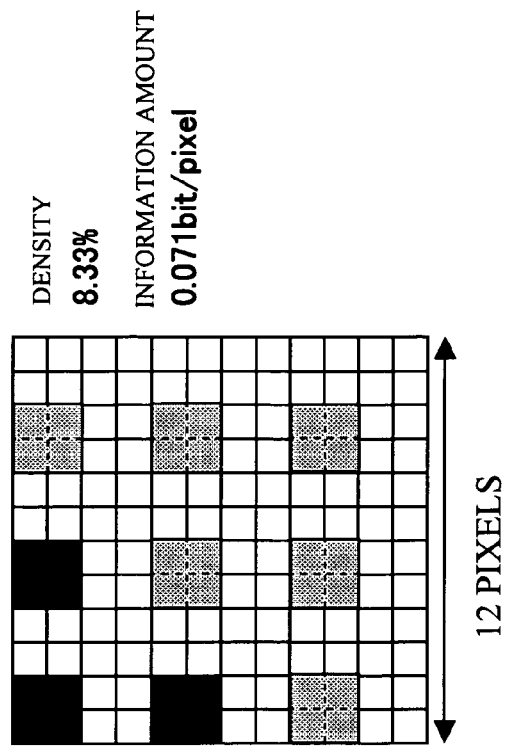
Figure 6:
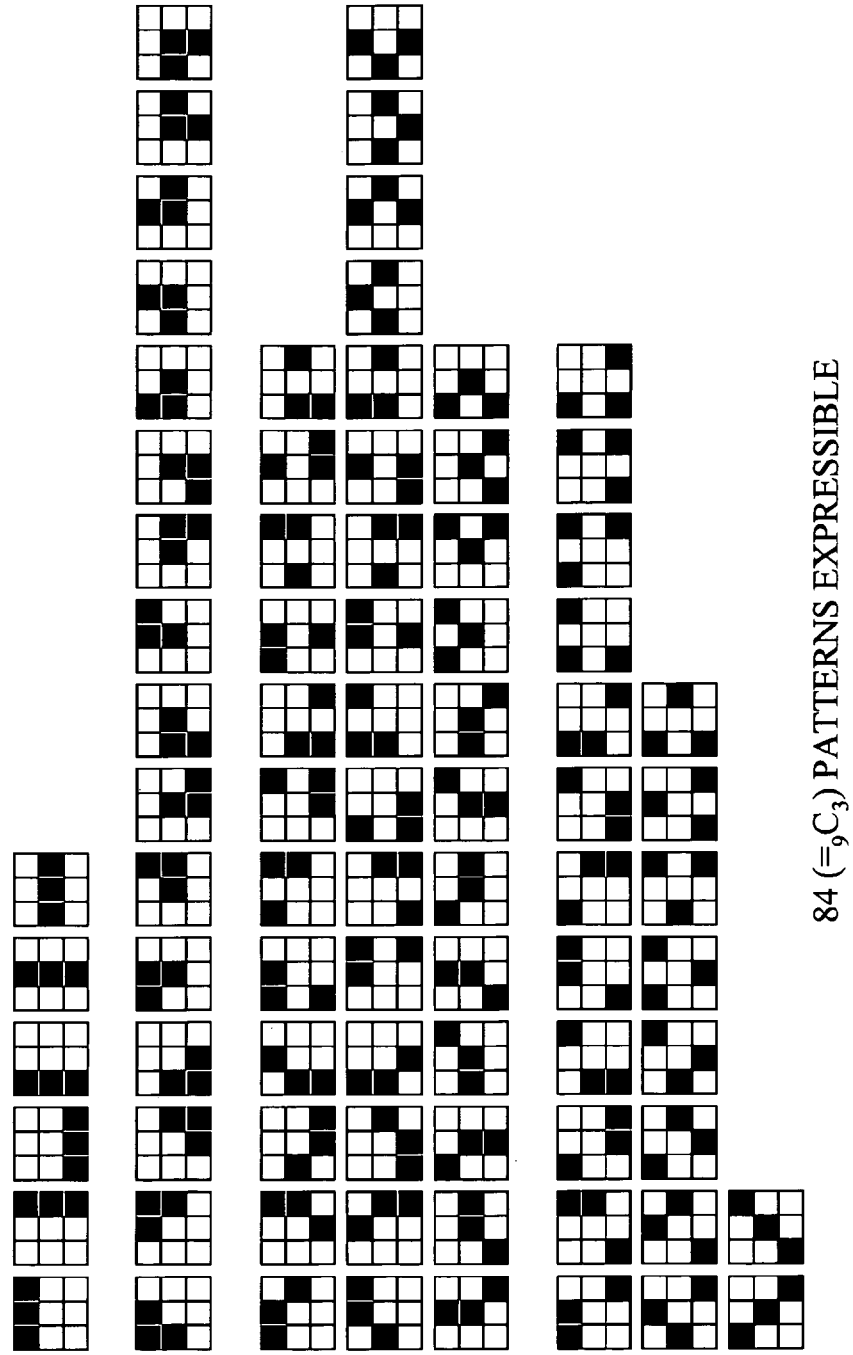
FIG. 6 is a view showing code patterns of 9C3 method.

As another form of the code pattern, as shown in FIG. 3B, it is possible that 3 dots are selected from 9-dot printing areas to obtain dot printing areas. This method will be hereinafter referred to as 9C3 method. In this case, though the density becomes 8.33%, the information amount becomes 0.071 bits/pixel, which means an information amount per pixel can be increased. FIG. 6 shows code patterns of the 9C3 method. In the 9C3 method, 84 patterns shown in FIG. 6 can be expressed.

Figure 8:
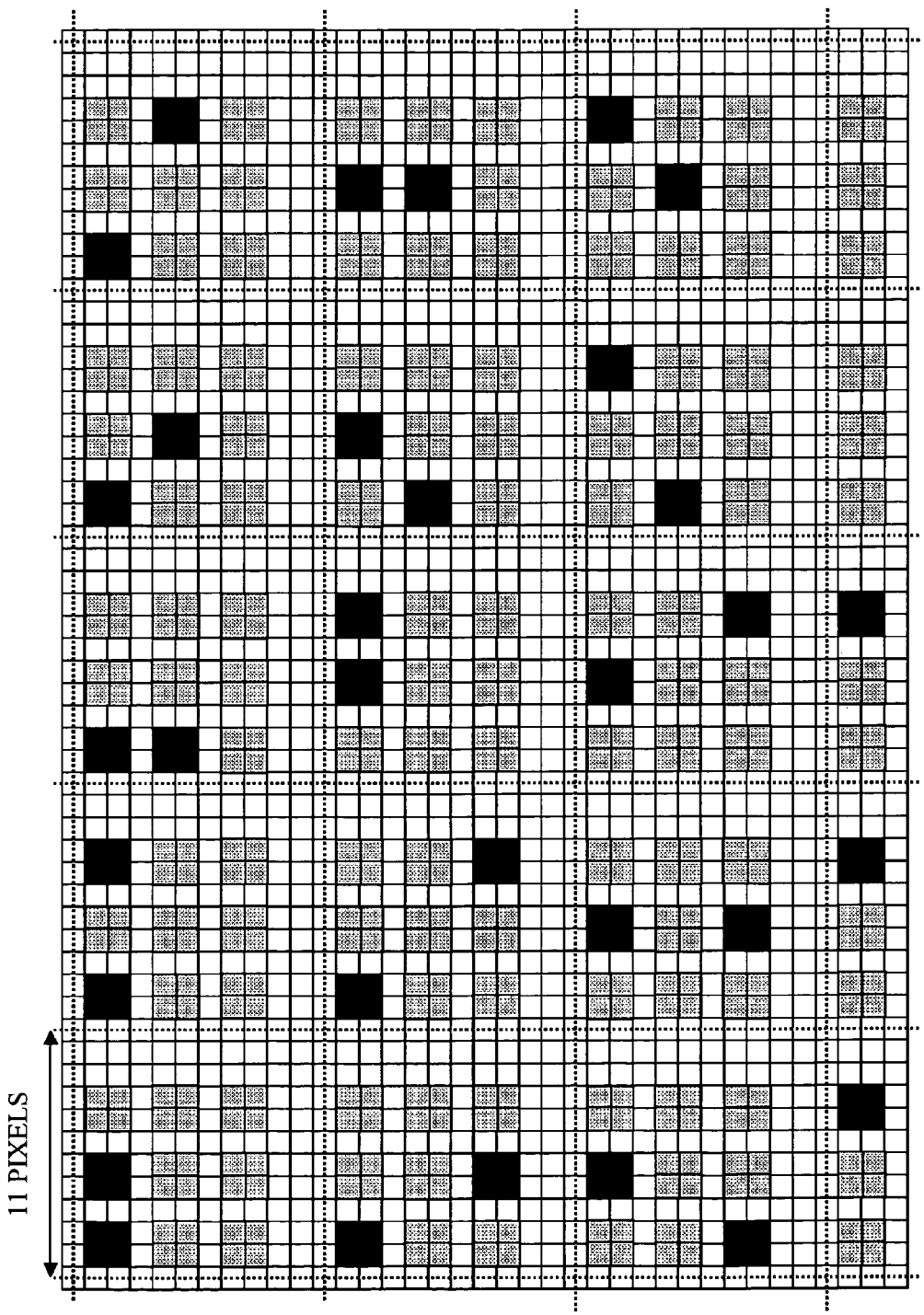
FIG. 8 is an arrangement example of code patterns of 9C2 method.

Comparison will be hereinafter made between the code pattern of the 9C2 method and the benchmark shown in FIG. 2A. A curve A shown in FIG. 7 represents changes in the density of the code pattern of the 9C2 method when the size of the above-described block is changed. A curve B represents changes in the information amount expressible by the code pattern of the 9C2 method when the size of the above-described block is changed. A curve C represents changes in the density in the benchmark when the block size is changed. A curve D represents changes in the information amount expressible by the benchmark when the block size is changed. As shown in FIG. 7, by setting the size of 1 block to (10×10) to (11×11), the information amount and the density of the code pattern of the 9C2 method can exceed the information amount and the density of the benchmark. However, when the block size is set to (10×10) or (11×11), a space between dots is narrow, and an error may occur in judging dots. FIG. 8 shows a case where 2 dots are printed leaving 1 pixel space in an 11×11 pixel block. FIG. 9 shows a case where 2 dots are printed without leaving a space in the 11×11 pixel block. Therefore, in the present exemplary embodiment, 12×12 pixel block leaving 2 pixels between each dot is used. Thereby, while the expressible information amount and the density can be maintained, judging dots can be accurately performed. When the 12×12 pixel block is used, every space between each dot becomes 2 pixels, resulting in inability of judging block break points. However, the block break points can be judged after detecting dots instead of during the stage of detecting dots. A method of judging block break points will be described later.

The code pattern is not limited to the above-described patterns, but may be the following patterns. FIGS. 10A and 10B show results of examining a relation among the area (block) size, the total number of dot printing areas, and the number of dots practically printed. FIG. 10A shows a relation of the density, and FIG. 10B shows a relation of the information amount. When FIG. 10A is compared with FIG. 10B, the areas in which the density is equal to or less than the benchmark and the information amount is equal to or more than of the benchmark correspond to candidates 1 to 5 shown in FIG. 11. Code patterns of the candidates 1 to 5 are shown in FIGS. 12A to 12F. Patterns of candidates 6 and 7 are the patterns of FIGS. 3A and 3B described above.

FIG. 12A shows the pattern, the density, and the information amount of the benchmark. FIG. 12B shows the pattern of candidate 1. In the pattern, 1 dot is printed in a 7×7 pixel block, the density is equal to the benchmark, and the information amount can exceed the benchmark. FIG. 12C shows the pattern of candidate 2. In the pattern, 1 dot is printed in a 7×7 pixel block, the density is equal to the benchmark, and the information amount can exceed the benchmark. FIG. 12D shows the pattern of candidate 3. In the pattern, 1 dot is printed in an 8×8 pixel block, the density is lower than of the benchmark, and the information amount can exceed the benchmark. FIG. 12E shows the pattern of candidate 4. In the pattern, 2 dots are printed in a 10×10 pixel block, the density is lower than of the benchmark, and the information amount can exceed the benchmark. FIG. 12F shows the pattern of candidate 5. In the pattern, 2 dots are printed in an 11×11 pixel block, the density is lower than of the benchmark, and the information amount can exceed the benchmark.

Next, a description will be given of arrangement of code patterns on the printed material for displaying given information. In the present exemplary embodiment, given information includes image identification information for identifying an image to be printed, coordinate value information indicating a position on the printed material (X coordinate, Y coordinate), and a synchronous code which becomes the reference point in decoding information. The following description will be given of an example in which the printed material is a printed material having multiple pages, and the image identification information is a page number for identifying each page of the printed material.

Figure 13:
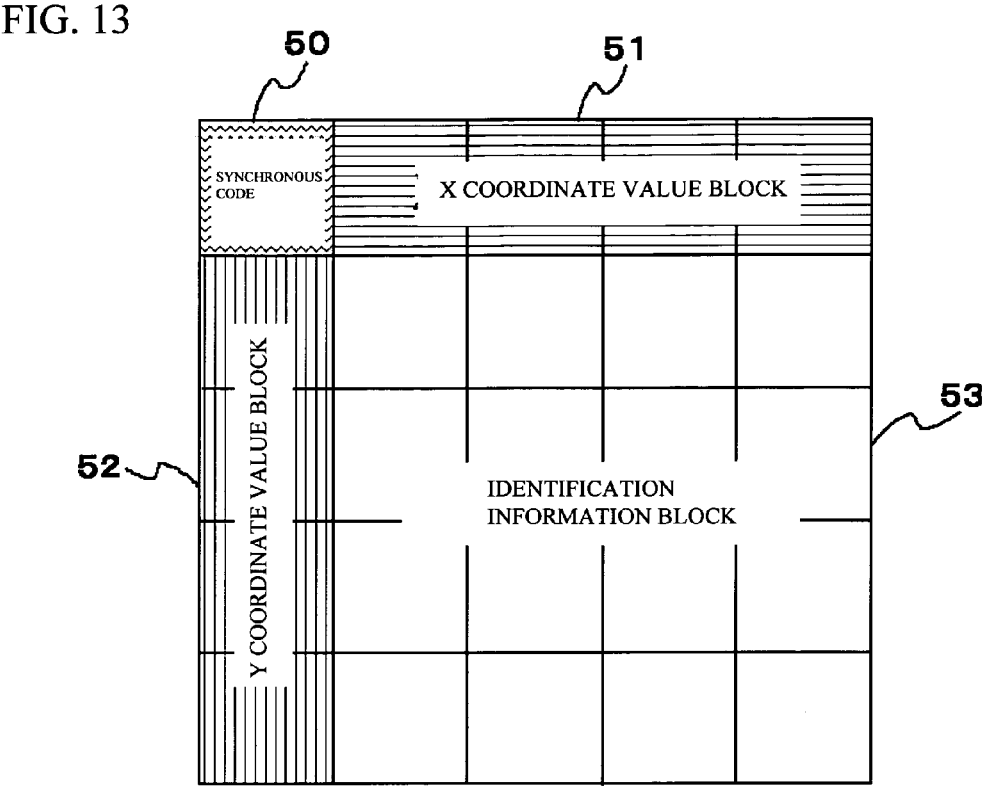
FIG. 13 is a view showing a pattern layout of a 5×5 block.

FIG. 13 shows an example of arrangement of image identification information, coordinate information, and a synchronous code in a 5×5 block. In the present exemplary embodiment, the 5×5 block is a unit of coding. In the upper left block of the 5×5 block, there is arranged a block representing the synchronous code (hereinafter referred to as a synchronous block 50). In the blocks of the same line as of the synchronous block 50, there are arranged code patterns representing a coordinate value of the X coordinate. Such a block is hereinafter referred to as an X coordinate value block 51. In the block of the same column as of the synchronous block 50, there are arranged code patterns representing a coordinate value of the Y coordinate. Such a block is hereinafter referred to as a Y coordinate value block 52. Further, in the 4×4 block other than the synchronous block 50, there are arranged the X coordinate value block 51, and the Y coordinate value block 52, code patterns representing the image identification information. Such a block is hereinafter referred to as an identification information block 53.

Figure 14:
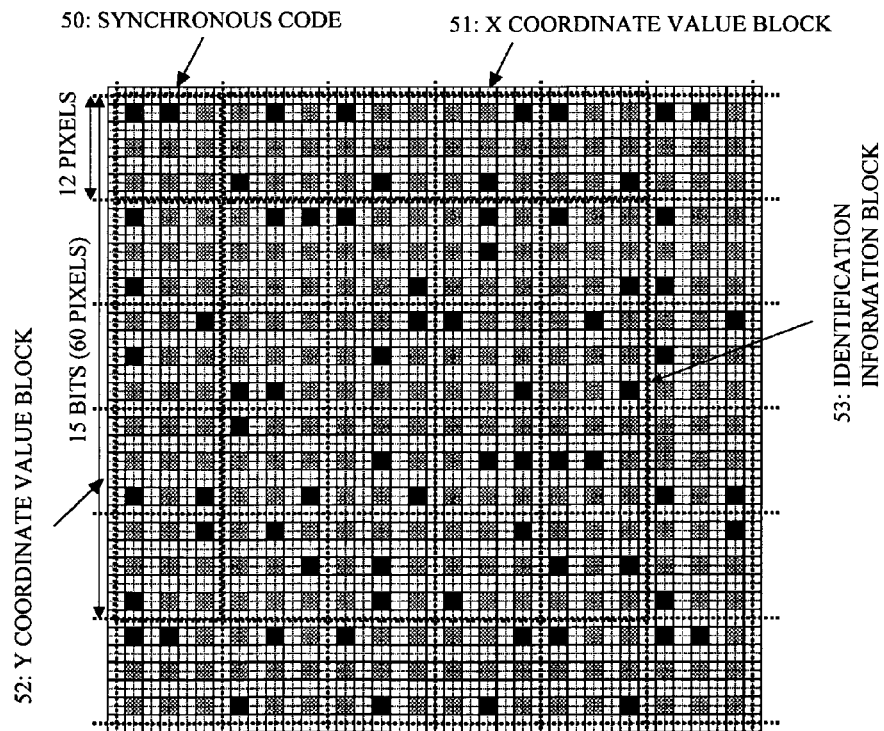
FIG. 14 is a view showing an example of arranging code patterns of 9C2 in a 5×5 block.
Figure 15:
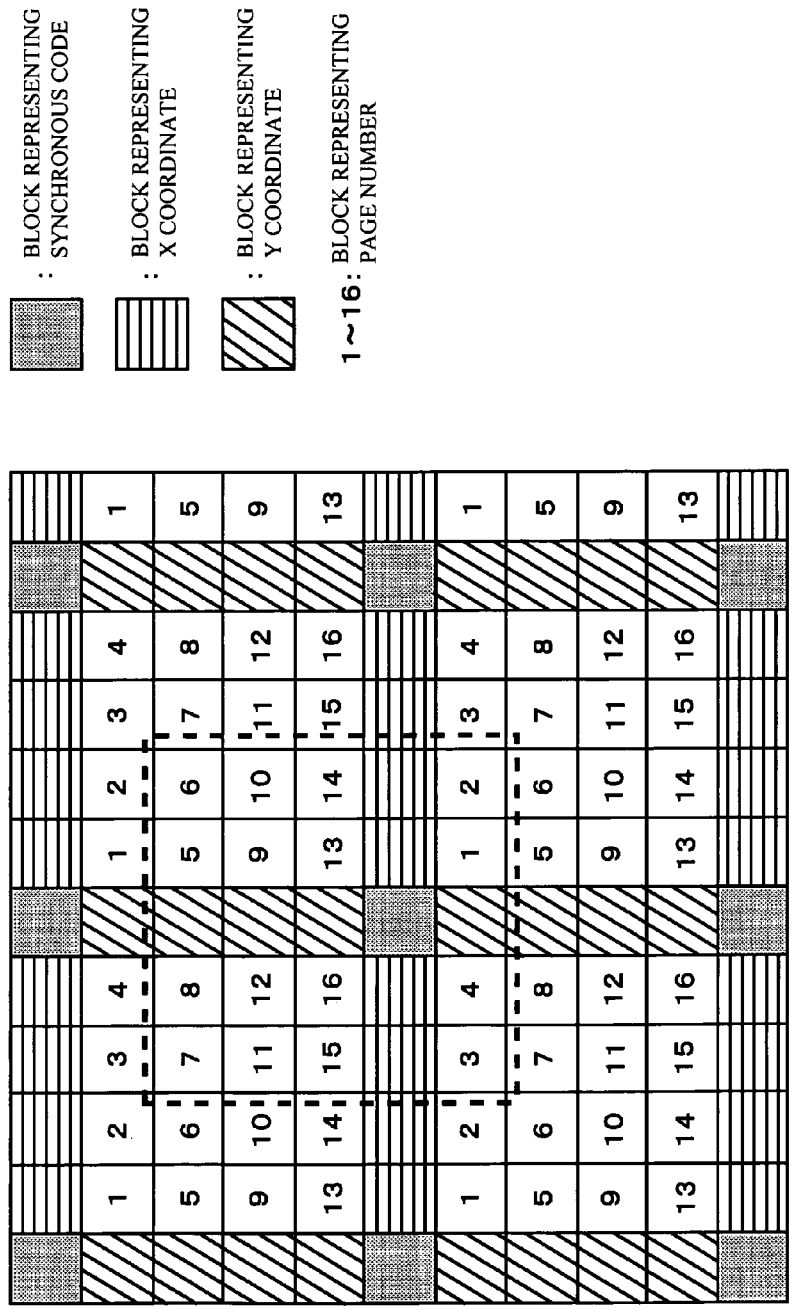
FIG. 15 is a view showing a state that multiple 5×5 blocks are arranged continuously.

In one block, one of the code patterns shown in FIGS. 3A to 6 and FIGS. 8 to 9 are arranged. FIG. 14 shows a pattern layout of a 5×5 block in which one of 9C2 code patterns is arranged in one block. FIG. 15 shows a state in which multiple 5×5 blocks are continuously arranged. The X coordinate value block 51 and the Y coordinate value block 52 are blocks representing coordinate values of these blocks. In the identification information block 53, identical information is repeatedly inserted. For example, when the coordinate information is expressed by a code pattern capable of expressing 4 bits, the total 16 bits can be expressed by 4 blocks. When a block representing a page number is expressed by a code pattern capable of expressing 5 bits, the total 80 bits (5 bits×16) can be expressed by 16 blocks. When 6 blocks out of the 16 blocks are used for error correction, $2^{50}$ bits can be expressed by 5 bits×10 blocks. That is, from the formula of $2^{50}=1.126\times10^{15}$, 1,126 trillion page numbers can be expressed. Further, when 80 bits are divided into 8×10 blocks and parity check bits are inserted in each line and each column, from the formula of $2^{7\times9}=9.223\times10^{18}$, 922.3 ten quadrillion page numbers can be expressed.

Figure 16:
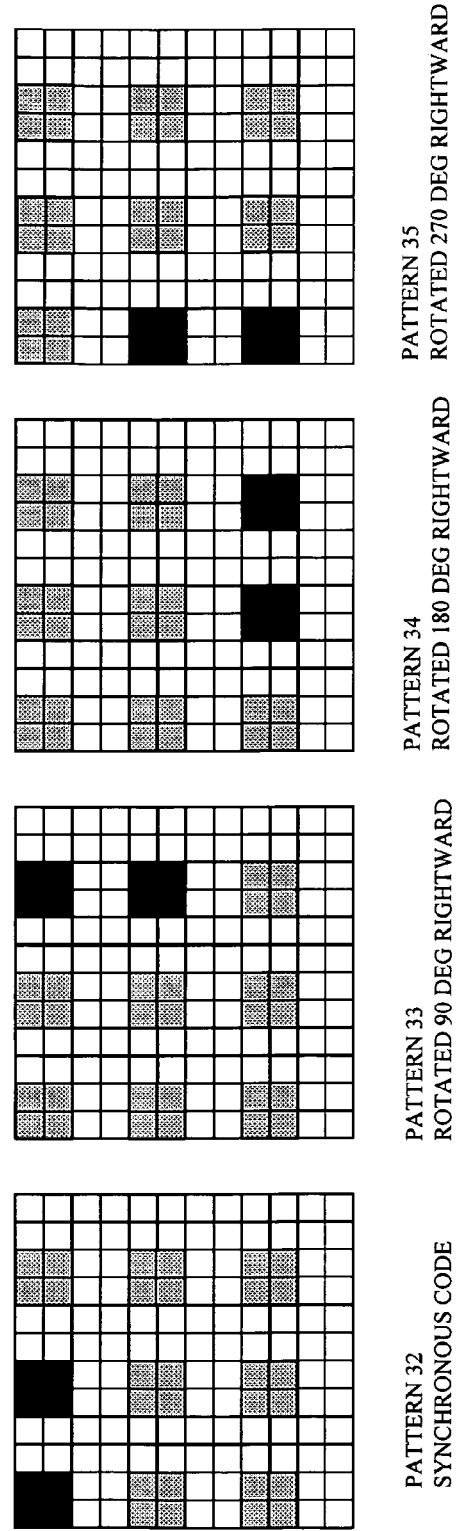
FIG. 16 is a view showing synchronous code patterns.
Figure 17:
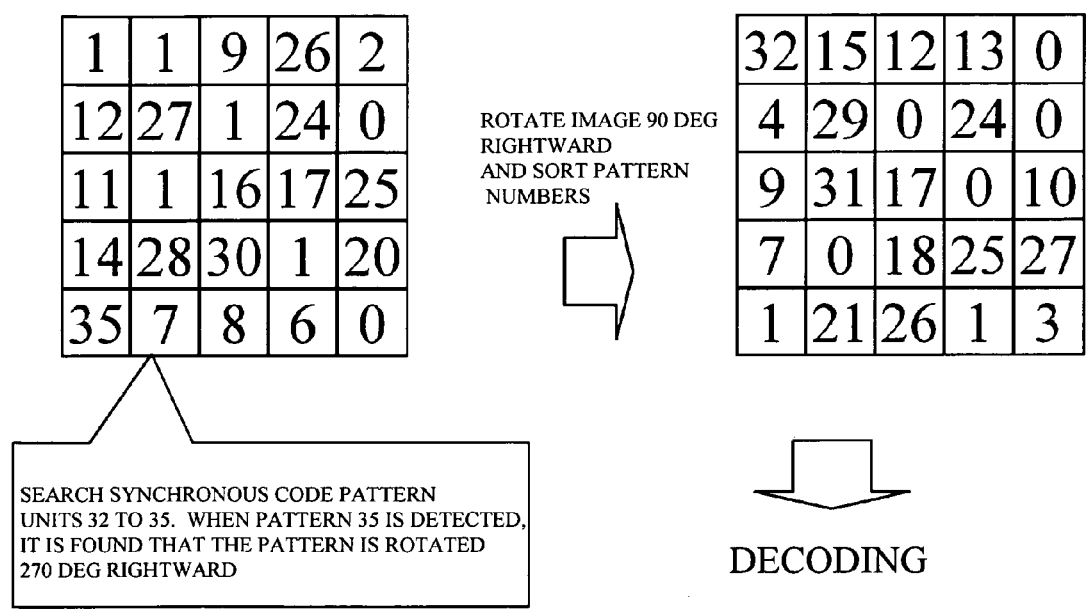
FIG. 17 is a view for explaining a method of rotating a code pattern in the correct direction from a synchronous code.

Next, synchronous codes will be described. The synchronous code represents the direction of the code pattern and the reference point in decoding information in the block. For the synchronous codes, out of the code patterns shown in FIG. 4, the code patterns with the pattern values 32 to 35 are used. As shown in FIG. 16, when one of the code patterns with the pattern values 32 to 35 is selected, other 3 code patterns correspond to the patterns rotated 90 degrees, 180 degrees, and 270 degrees from the selected code pattern respectively. As the synchronous codes, in addition to the above-described patterns, groups of patterns with pattern values 4 to 7, 8 to 11, 12 to 15, 16 to 19, 20 to 23, 24 to 27, and 28 to 31 are available. These patterns are groups of patterns corresponding to each other when each thereof is rotated. For example, as shown in FIG. 17, one of the synchronous codes of the patterns 32 to 35 is inserted into a specified position of the above-described 5×5 block frame. Here, the pattern No. 32 is inserted into the upper left of the 5×5 block. Then, an image is read and the patterns with the pattern values 32 to 35 are searched. Here, for example, the pattern No. 35 is detected as shown in FIG. 17. In this case, the image is rotated 90 degrees rightward in order to convert the pattern No. 35 to the pattern No. 32. The pattern with the pattern value 35 is an image obtained by rotating the pattern No. 32 rightward 270 degrees as shown in FIG. 16. Thereby, information can be decoded in the correct direction.

Figure 18:
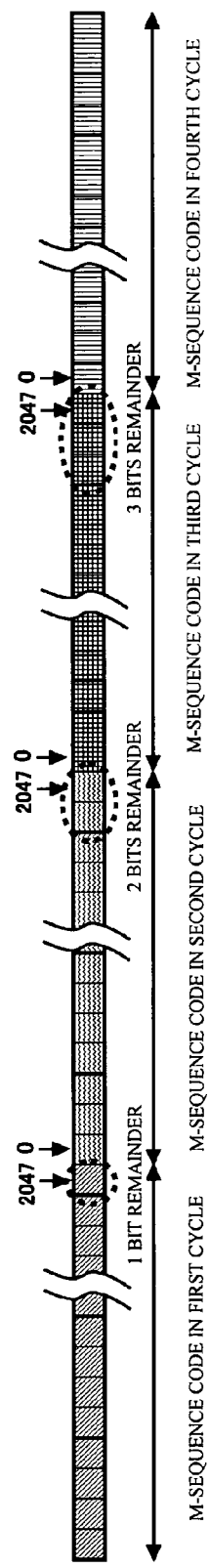
FIG. 18 is a view for explaining a method of coding a coordinate value by using M-sequence code.
Figure 19:
FIG. 19 is a view showing a state of coding a coordinate value for every 4 bits by using the M-sequence code.

Next, a description will be given of the code patterns of the X coordinate and the Y coordinate. The coordinate values of the X coordinate and the Y coordinate are coded by an M-sequence code. The M-sequence code is a sequence having a cycle with specific length. The M-sequence code has characteristics that one partial sequence thereof does not correspond to any of the other partial sequences thereof. In the present exemplary embodiment, the M-sequence code is used for coding the coordinate values. FIG. 19 shows an example that the M-sequence code is expressed by code patterns capable of expressing 4 bits respectively. The M-sequence has characteristics that one partial sequence thereof does not correspond to any of the other partial sequences thereof. When such characteristics are utilized, a position on the M-sequence can be determined by a partial sequence, that is, such characteristics can be utilized for positioning. As described above, the coordinate information is expressed by 4 blocks of the code patterns capable of expressing 4 bits respectively, thus the coordinate information expresses 16 bits. Therefore, when the M-sequence in the 16th order or less is used, a position can be determined. In the present exemplary embodiment, the M-sequence code in the 11th order is utilized. In the case of the M-sequence code in the 11th order, the code length is 2047 bits. In this case, a value of one partial sequence being 11-bit long taken from the M-sequence code never corresponds to a value of any of the other partial sequences being 11-bit long. Further, in the present exemplary embodiment, as shown in FIG. 18, 4 cycles of the M-sequence code in the 11th order are connected to be used for coding the coordinate values. On the assumption that 1 cycle of the M-sequence code in the 11th order is 2047 bits, and one code pattern expresses 4 bits, the M-sequence code in the first cycle has a remainder of 1 bit. The remainder of 1 bit and the front end 3 bits of the M-sequence code in the second cycle are used to express the next coordinate value. Therefore, displacement by 1 bit is generated between the M-sequence code in the first cycle and the M-sequence code in the second cycle. Therefore, each M-sequence code used for code patterns is not identical to each other. Similarly, the M-sequence code in the second cycle has a remainder of 2 bits. The remainder of 2 bits and the front end 2 bits of the M-sequence code in the third cycle are used to express the next coordinate value. Further, the M-sequence code in the third cycle has a remainder of 3 bits. The remainder of 3 bits and the front end 1 bit of the M-sequence code in the fourth cycle are used to express the next coordinate value.

The M-sequence code is used for coding the coordinate values. Therefore, even when an error occurs in 1 block out of the 4 blocks representing the coordinate value, the error can be corrected by utilizing characteristics of the M-sequence code.

Next, a description will be given of a method of coding the image identification information with reference to FIGS. 20A to 20E. In the present exemplary embodiment, input information shown in FIG. 20A is converted into binary information shown in FIG. 20B. The binary information is converted into a pattern value of RS (reed solomon) code (FIG. 20C). When such a pattern value is expressed by code patterns shown in FIG. 4, the code patterns shown in FIG. 20E are obtained. Then, the input information shown in FIG. 20A may be converted into the multi-valued expression shown in FIG. 20D. The pattern value of the RS code of FIG. 20C represents power expression of Galois Field utilized for the code. That is, pattern value 10 represents an identity element of Galois Field raised to the 10th power.

Next, a description will be given of a technique for decreasing density unevenness. First, a description will be given of the cause of density unevenness with reference to FIG. 21. When the above-described code patterns representing given information are printed on the sheet as a background image, identical patterns are arranged side by side according to the information to be expressed. Repeating identical patterns leads to density unevenness. For example, when image identification information represents a page number and the page number is a small number, 0 sequentially exists in upper bits of the image identification information. Such form is repeatedly arranged in the identification information block 53 of a 5×5 block. Thus, multiple codes sequentially expressing 0 are shown. Further, the pattern value of the X coordinate becomes the same value as the pattern value of the X coordinate of another block in the corresponding line. Similarly, the pattern value of the Y coordinate becomes the same value as the pattern value of the Y coordinate of another block in the corresponding column. Due to such a cyclic arrangement of the identical pattern value, density unevenness is shown when the code patterns are printed on the sheet.

Therefore, in the present exemplary embodiment, by utilizing the characteristics of the M-sequence code used for coding coordinate values, identical patterns are prevented from being arranged side by side continuously. The M-sequence code has characteristics of pseudorandom numbers. Therefore, as shown in FIG. 22, a pattern value of the X coordinate and a pattern value of the Y coordinate are added to a pattern value of the image identification code. The result thereof is divided by 32, and the remainder thereof is set to a new pattern number of the image identification information. The pattern value of the image identification code corresponds to a first pattern value in an aspect of the invention. The remainder number obtained by dividing the total of the pattern value of the X coordinate, the pattern value of the Y coordinate, and the pattern value of the image identification code by 32 corresponds to a second pattern value. There is no 5×5 block in which the pattern value of the X coordinate corresponds with the pattern value of the Y coordinate. In the identification information block, a pattern value of the X coordinate block 5 in the same column as the pattern value representing the image identification information and a pattern value of the Y coordinate value block 52 in the same line as the pattern value representing the image identification information are added to a pattern value representing the image identification information. Then, the resultant value is divided by 32, and the remainder thereof is set to a new pattern value representing the image identification information. The dividing value 32 is used since 32 codes from No. 0 to No. 31 shown in FIG. 4 are used for expressing the image identification information. The dividing number may vary according to the number of codes to be used. In FIG. 23, pattern values after conversion are shown. As is obvious from the comparison of FIG. 21 and FIG. 23, there are no identical pattern values arranged side by side in the identification information block 53 after conversion.

Figure 21:
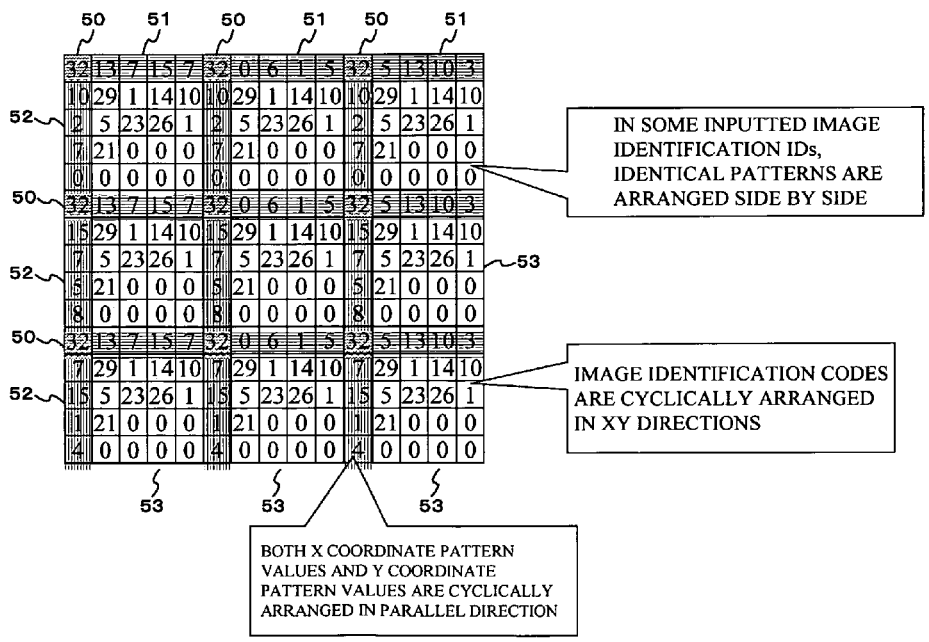
FIG. 21 is a view for explaining cause of density unevenness.
Figure 24:
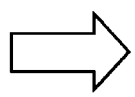
FIG. 24 is a view showing a method of decreasing density unevenness of code patterns showing coordinate value information.
Figure 25:
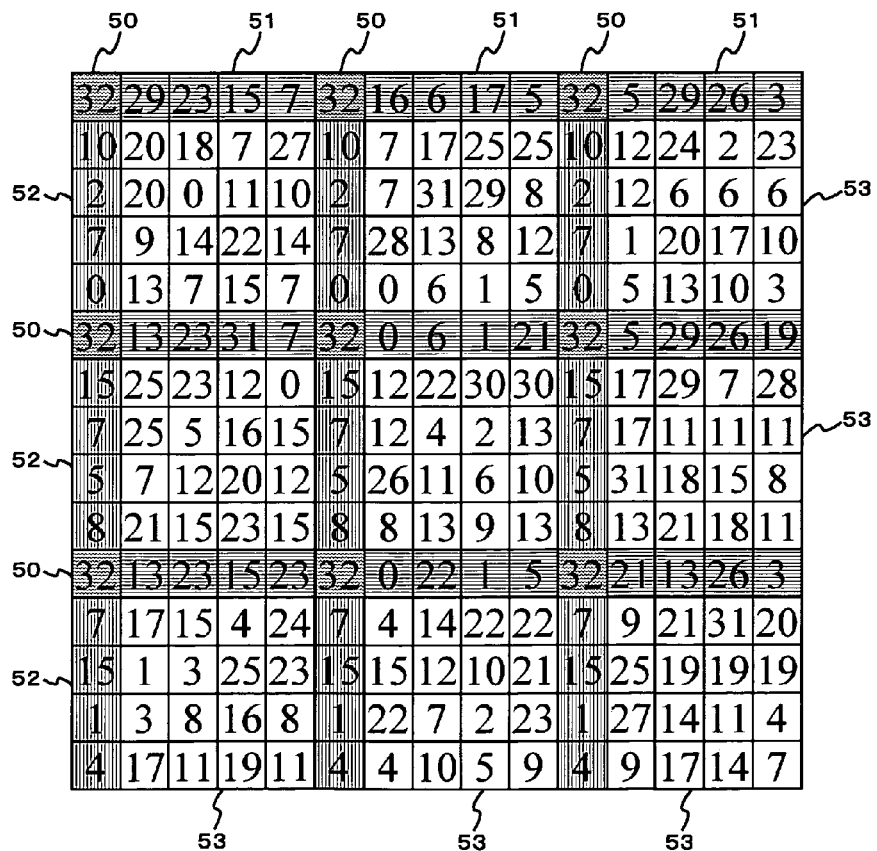
FIG. 25 is a view showing pattern values of the image identification information and coordinate values after performing the method of decreasing density unevenness.

As shown in FIG. 21, pattern values of the X coordinate become the same values as the pattern values in the X coordinate in the corresponding line of another block. Pattern values of the Y coordinate become the same values as the pattern values in the Y coordinate in the corresponding column of another block. Therefore, in the present exemplary embodiment, 0 or a given value is added to pattern values of the code patterns representing the coordinate, and the results thereof are set to new pattern values. For example, as a code pattern of a coordinate value before conversion, the code pattern of one of No. 0 to No. 15 shown in FIG. 4 is used. Therefore, as shown in FIG. 24, 0 or 16 is selected at random, and the selected numbers are added to the pattern numbers. When the code pattern is decoded, the remainder obtained by dividing by 16 can be used as a pattern value after conversion. FIG. 25 shows a block in which the pattern values of the X coordinate value block 51 are converted by the above-described procedure. As shown in FIG. 25, while the same pattern values are shown repeatedly in the Y coordinate value block 52, there is no repetitions of the same pattern value in the X coordinate value block 51.

As a method of decreasing density unevenness other than the above-described method employed in the present exemplary embodiment, it is possible that a random chart is prepared and sorted according to the random chart. In decoding, a random chart with which conversion is made inversely to in the random chart used in coding is prepared to decoding.

Figure 26:
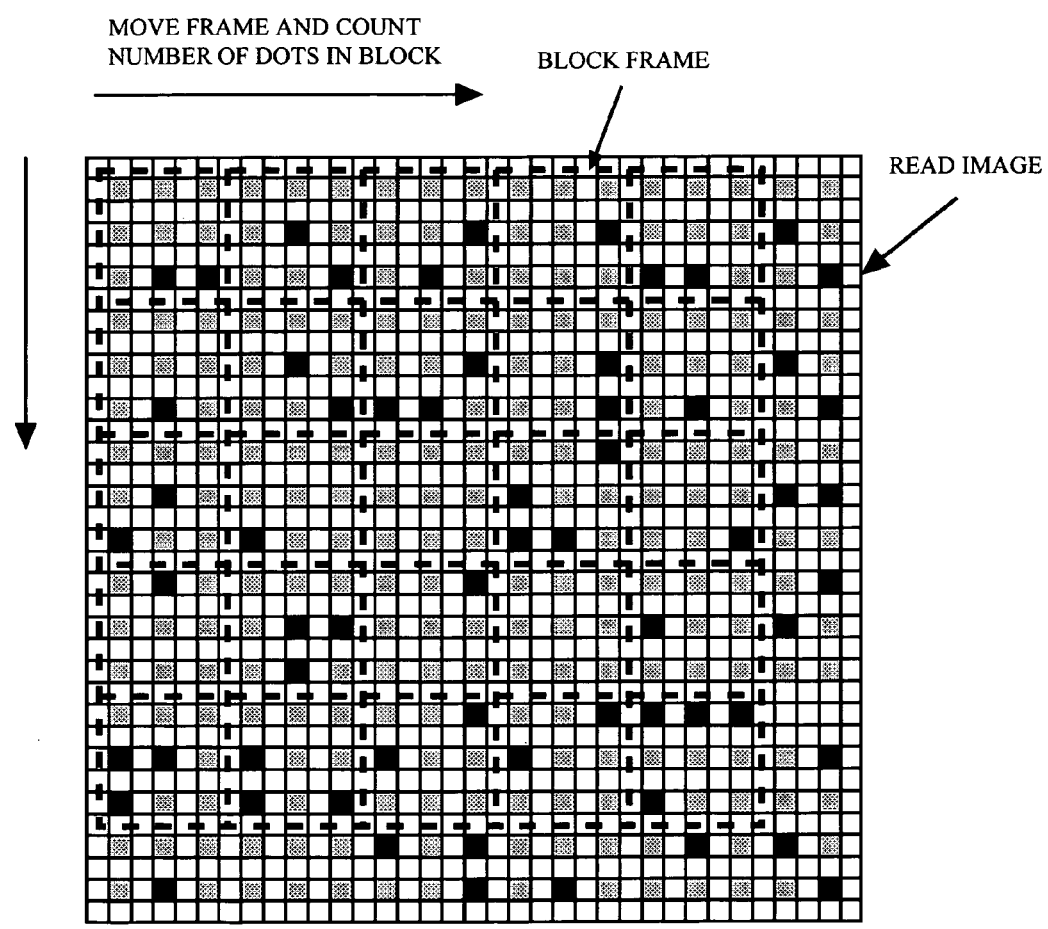
FIG. 26 is a view showing a state that a block frame is superimposed on dot patterns.
Figure 27:
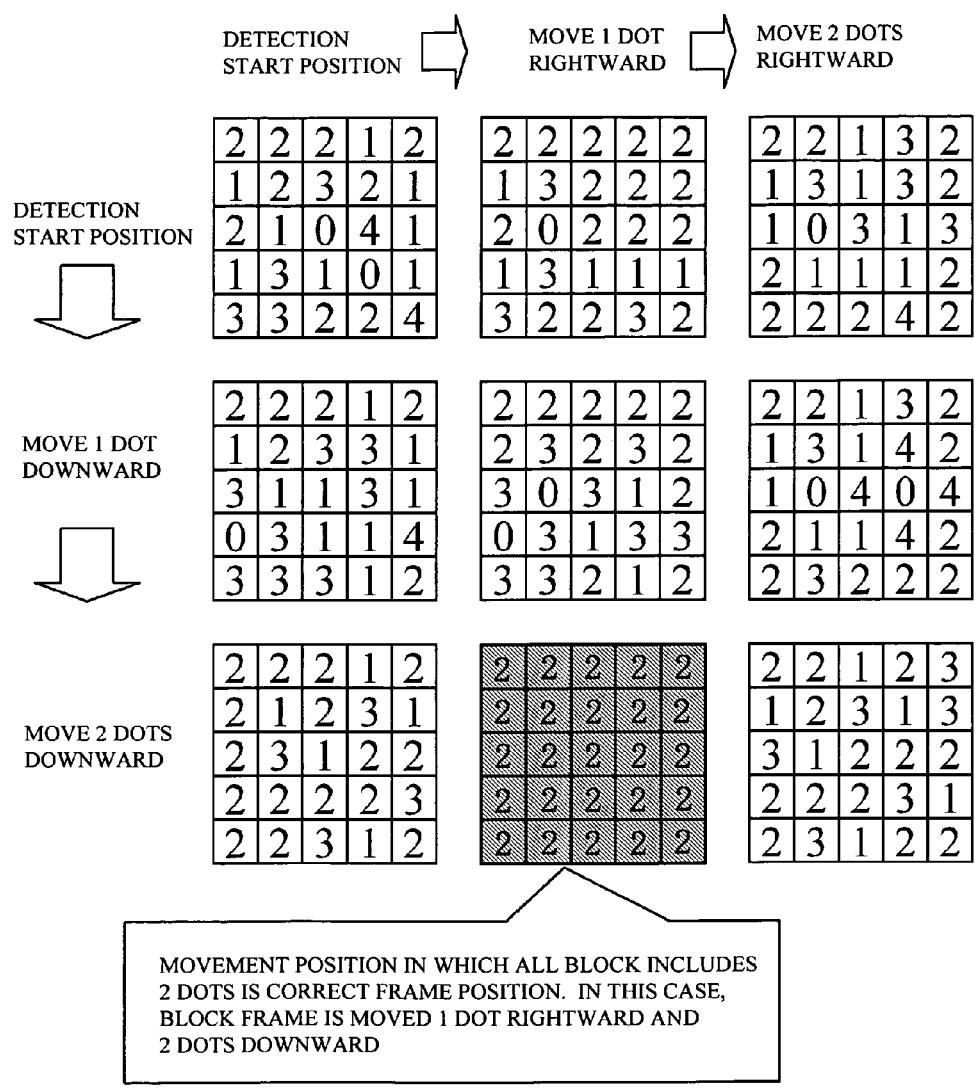
FIG. 27 is a view showing a procedure of moving the block frame and detecting block break points.
Figure 28A:
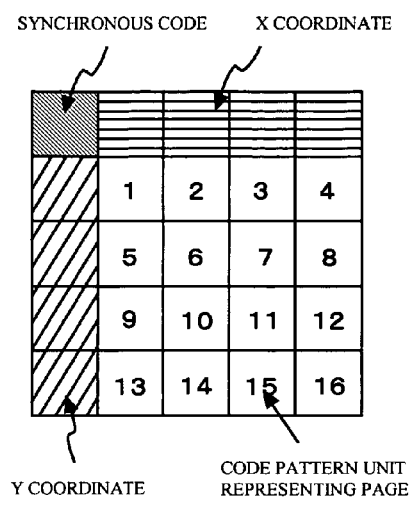
FIGS. 28A, 28B, and 28C are views for explaining a method of decoding a page number.
Figure 28B:
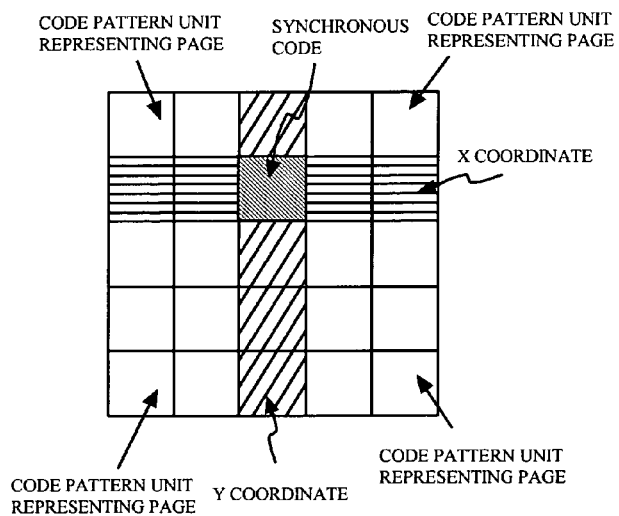
Figure 28C:
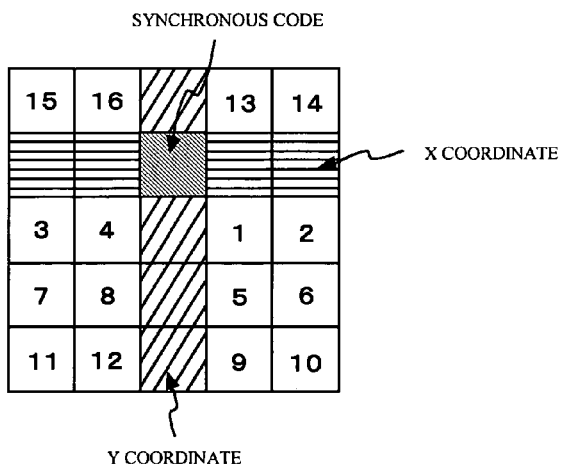

Next, a method of detecting the code patterns formed as above and obtaining information will be described. First, by an input device such as a pen device, code patterns in a predetermined size area are read. Next, as shown in FIG. 26, by superimposing a block frame on a read image, block break points are detected. The block frame is a minimum unit necessary in decoding the embedded information. In the present exemplary embodiment, a 5×5 block frame is used. As shown in FIG. 26, by moving the block frame, the position in which the number of dots printed in each block becomes 2 is searched. As shown in FIG. 27, by moving the block frame from the detection start position rightward and downward every line, the position in which the number of dots in each block becomes 2 is detected. Further, any image reading size can be decoded as far as the size is equal to or more than a 5×5 block. The code patterns representing a page number are reproduced throughout the whole page. Therefore, if a reading position is misaligned as a block frame denoted by a dotted line of FIG. 15, the codes representing a page number are repeatedly reproduced and therefore interpolation can be made to decode the page number. A more detailed description will be given of processing of detecting a page number and coordinate values with reference to FIGS. 28A to 28C. FIG. 28A shows a case where the synchronous code block 50 is read in an appropriate position of the upper left of a 5×5 block. FIG. 28B shows a case where the reading position is misaligned. In the case of FIG. 28B, the synchronous code exists in the block which is the third from the left and the second from the top. Wherever the X coordinate and the Y coordinate are read from, the read coordinates which are partial sequences of the whole sequence can be decoded. In reading a page number, as shown in FIG. 28C, the block located lower right of the synchronous code is assigned to the first block, and the block on the right side of the first block is assigned to the second block. Further, if there is no block on the right side of the first block, the block located at the far left is used. Next, from the block on the right side of the first block, reading is performed sequentially rightward. After the sequential reading reaches the Y coordinate pattern, the bottom block is read, and sequential reading is repeated as above. Then, when reading the final line in the Y axis direction is finished, as shown in FIG. 28C, reading position goes back to the top line, and reading is performed from the top block above the first block. By performing decoding in this order, the page number can be obtained. In reading the X coordinate, blocks in the line including the synchronous code are read by skipping the synchronous code. In reading the Y coordinate, blocks in the column including the synchronous code are read by skipping the synchronous code. By reading the blocks in this order, the coordinates can be decoded.

(Structure of Image Generating Apparatus)

Figure 29:
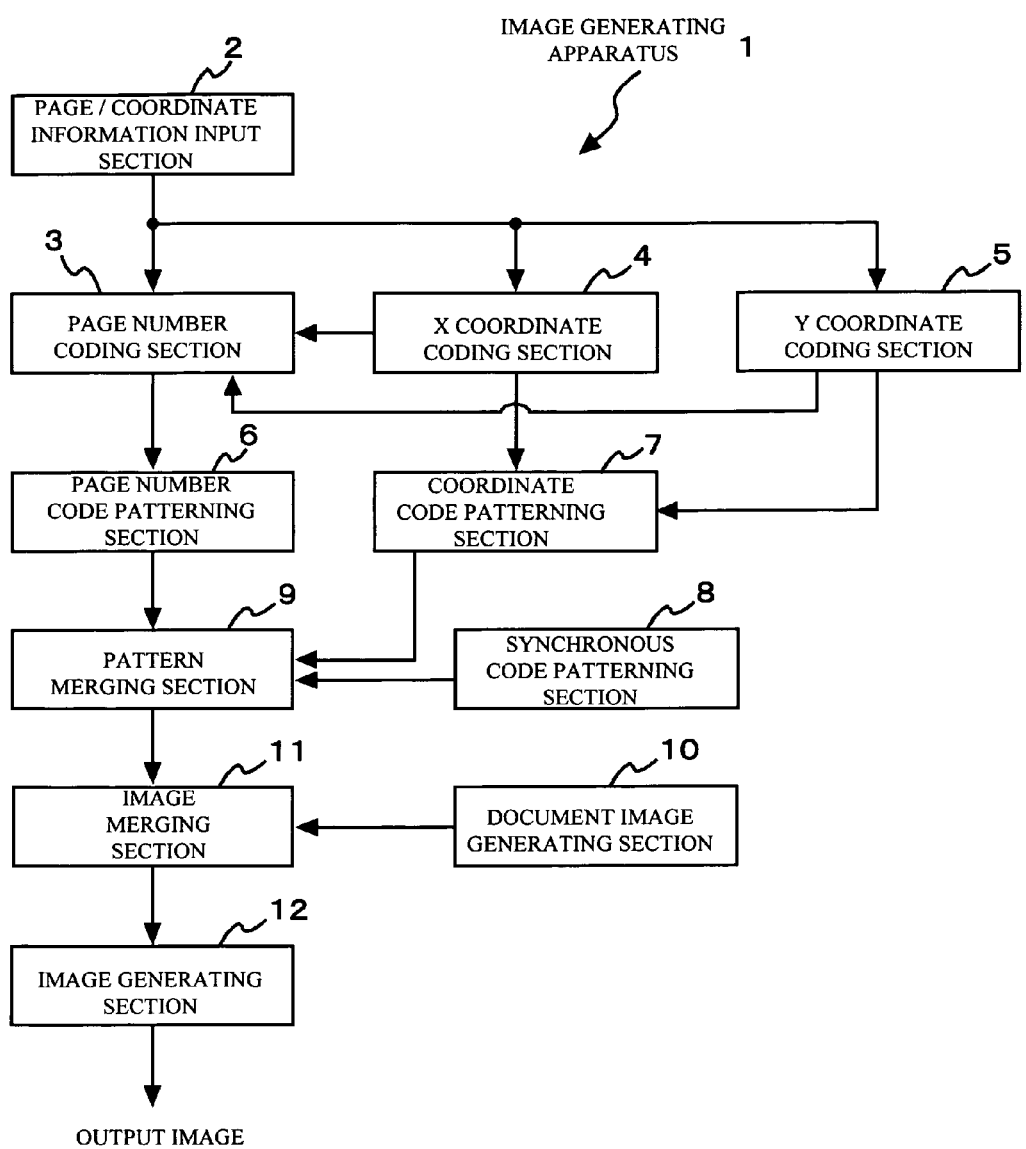
FIG. 29 is a view showing a structure of an image generating apparatus.

Next, with reference to FIG. 29, a structure of an image generating apparatus 1 for generating the above-described coded pattern will be described. As shown in FIG. 29, the image generating apparatus 1 includes a page/coordinate information input section 2, a page number coding section 3, an X coordinate coding section 4, a Y coordinate coding section 5, a page number code patterning section 6, a coordinate code patterning section 7, a synchronous code patterning section 8, a pattern merging section 9, a document image generating section 10, an image merging section 11, and an image generating section 12.

The page/coordinate information input section 2 outputs a page number for every page to the page number coding section 3. Further, the page/coordinate information input section 2 outputs X axis coordinate information on each page to the X coordinate coding section 4, and outputs Y axis coordinate information on each page to the Y coordinate coding section 5.

The page number coding section 3 codes page information inputted from the page/coordinate information input section 2. Further, the page number coding section 3 adds a coded X coordinate value and an coded Y coordinate value to the coded page number, and divides the result thereof by 32. The remainder obtained by the division is a pattern value of the coded page number. In the present exemplary embodiment, the pattern values from 0 to 31 shown in FIG. 4 are used for coding the page number. Therefore, the remainder obtained by dividing by 32 is set to the pattern value representing the page number. The coded page information is outputted to the page number code patterning section 6.

The X coordinate coding section 4 codes the X coordinate information by using the M-sequence code or the like. Further, the X coordinate coding section 4 selects 0 or 16 at random, and adds the selected number to the coded X coordinate value. The resultant value is a pattern value of the coded X coordinate. The Y coordinate coding section 5 codes the Y coordinate information by using the M-sequence code or the like. Further, the Y coordinate coding section 5 selects 0 or 16 at random, and adds the selected number to the coded Y coordinate value. The resultant value is a pattern value of the coded Y coordinate. Coded information of the X coordinate and the Y coordinate is outputted to the coordinate code patterning section 7.

The page number code patterning section 6 generates a code pattern of the coded page number, and outputs the code pattern to the pattern merging section 9. The coordinate code patterning section 7 generates code patterns of the coded X coordinate and the coded Y coordinate, and outputs the code patterns to the pattern merging section 9.

Further, a code patterned synchronous code is outputted from the synchronous code patterning section 8 to the pattern merging section 9. The pattern merging section 9 merges pattern images of the page number, the X coordinate, the Y coordinate, and the synchronous code, and generates background image data for 1 page to be arranged in a given position on the page.

The image merging section 11 generates an image in which a document image outputted from the document image generating section 10 is superimposed on the code patterns of the page number, the X coordinate, the Y coordinate, and the synchronous code outputted from the pattern merging section 9. By outputting the image data to the image generating section 12, an image in which the document image is formed on the code patterns is printed on the sheet.

Figure 30:
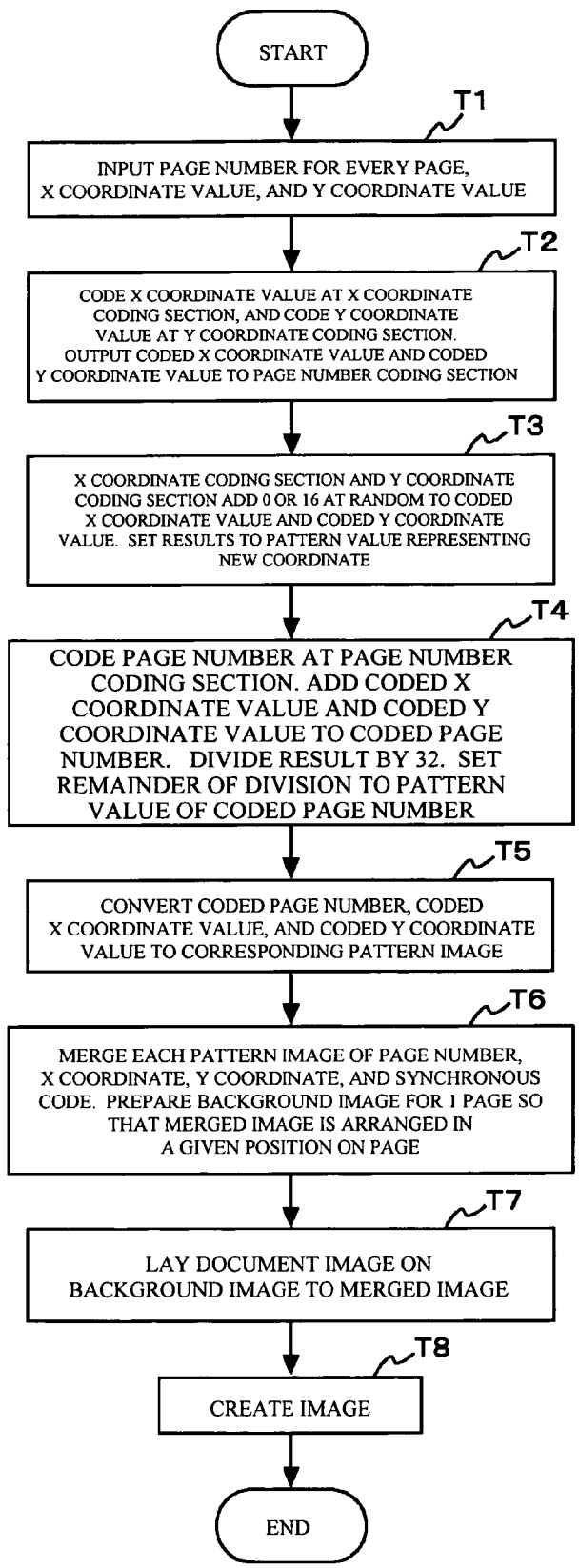
FIG. 30 is a flowchart showing a processing procedure of the image generating apparatus.

A description will be given of a processing procedure of the image generating apparatus 1 with reference to the flowchart shown in FIG. 30. First, a page number outputted from the page/coordinate information input section 2 is inputted to the page number coding section 3. X coordinate information is inputted to the X coordinate coding section 4, and Y coordinate information is inputted to the Y coordinate coding section 5 (step T1). The X coordinate coding section 4 codes the inputted X coordinate value by using the M-sequence code or the like. Similarly, the Y coordinate coding section 5 codes the inputted Y coordinate value by using the M-sequence code or the like. The coded X coordinate value and the coded Y coordinate value are outputted to the page number coding section 3 (step T2). Further, the X coordinate value coding section 4 selects 0 or 16 at random, and adds the selected number to the coded X coordinate value. The resultant value is a pattern value representing a new X coordinate vale. Similarly, the Y coordinate value coding section 5 selects 0 or 16 at random, and adds the selected number to the coded Y coordinate value. The resultant value is a pattern value representing a new Y coordinate value (step T3).

Next, the page number coding section 3 codes the page number. Further, the page number coding section 3 adds the coded X coordinate value and the coded Y coordinate value to the coded page number, and divides the resultant value by 32. The remainder obtained by the division is a pattern value of the coded page number (step T4).

Next, the coded page number, the coded X coordinate value, the coded Y coordinate value are image-patterned in each block, and thus conversion is made to the pattern image shown in FIG. 3A or FIG. 3B (step T5). Each pattern image of the page number, the X coordinate, the Y coordinate, and the synchronous code is merged to be arranged in a given position on the page, and thereby a background image for one page is prepared (step T6). Images such as a document and an image are superimposed on the background image to merge an image (step T7). The superimposed images are generated at the image generating section 12 (step T8).

(Image Processing Apparatus)

Figure 31:
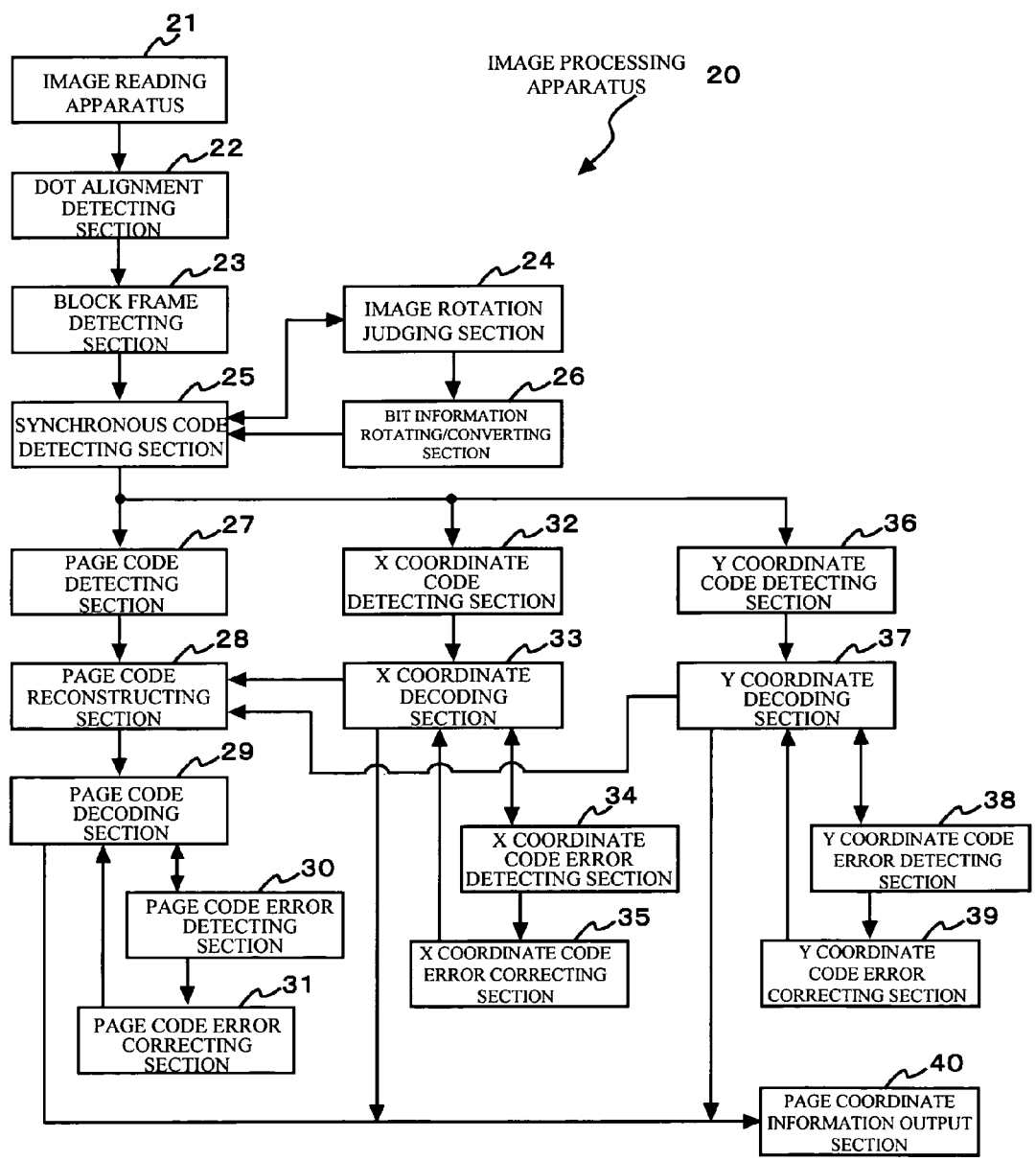
FIG. 31 is a view showing a structure of an image processing apparatus.

Next, with reference to FIG. 31, a structure of an image processing apparatus 20 for reading an image with code patterns and processing the image will be described. As shown in FIG. 31, the image processing apparatus 20 includes an image reading apparatus 21, a dot alignment detecting section 22, a block frame detecting section 23, an image rotation judging section 24, a synchronous code detecting section 25, a bit information rotating/converting section 26, a page code detecting section 27, a page code reconstructing section 28, a page code decoding section 29, a page code error detecting section 30, a page code error correcting section 31, an X coordinate code detecting section 32, an X coordinate decoding section 33, an X coordinate code error detecting section 34, an X coordinate code error correcting section 35, a Y coordinate code detecting section 36, a Y coordinate decoding section 37, a Y coordinate code error detecting section 38, a Y coordinate code error correcting section 39, and a page coordinate information output section 40.

The image reading apparatus 21 is composed of an input device such as a pen type scanning device. The image reading apparatus 21 outputs read image data to the dot alignment detecting section 22. The dot alignment detecting section 22 detects dots from the read image data, and records coordinate values of the dots in a memory. A dot alignment which is dot arrangement information is recorded in the memory.

The block frame detecting section 23 superimposes a block frame on the dot arrangement developed in the memory, and adjusts a position of the block frame so that the number of dots in each block becomes 2.

The synchronous code detecting section 25 detects a synchronous code. The image rotation judging section 24 judges rotation of the image. The bit information rotating/converting section 26 rotates a code pattern by the rotation angle detected by the image rotation judging section 24, and sets the code pattern in the correct direction.

The X coordinate code detecting section 32 detects code patterns representing the X coordinate. The X coordinate decoding section 33 obtains a pattern value of the X coordinate from the detected code pattern, and divides the result by 16. The remainder of division is decoded as a coded X coordinate value. The X coordinate code error detecting section 34 detects an error of the decoded X coordinate codes. The X coordinate code error correcting section 35 corrects an error of the X coordinate codes. The corrected X coordinate codes are sent to the page code reconstructing section 28.

The Y coordinate code detecting section 36 detects code patterns representing the Y coordinate. The Y coordinate decoding section 37 obtains a pattern value of the Y coordinate from the detected code pattern, and divides the result by 16. The remainder of division is decoded as a coded Y coordinate value. The Y coordinate code error detecting section 38 detects an error of the decoded coordinate codes. The Y coordinate code error correcting section 39 corrects an error of the Y coordinate codes. The corrected Y coordinate codes are sent to the page code reconstructing section.

The page code detecting section 27 detects page code patterns from code patterns in the block frame. The page code reconstructing section 28 reassigns the code pattern numbers of the page obtained by using the corrected X coordinate code and the Y coordinate code, and sorts the reassigned code pattern numbers in the order of codes representing a page number. The page code decoding section 29 decodes the page code patterns. The page code error detecting section 30 detects an error of the decoded page codes. When the detected error of the page code is a correctable error, the page code error correcting section 31 corrects the error. The corrected page code is outputted to the page code decoding section 28.

Figure 32:
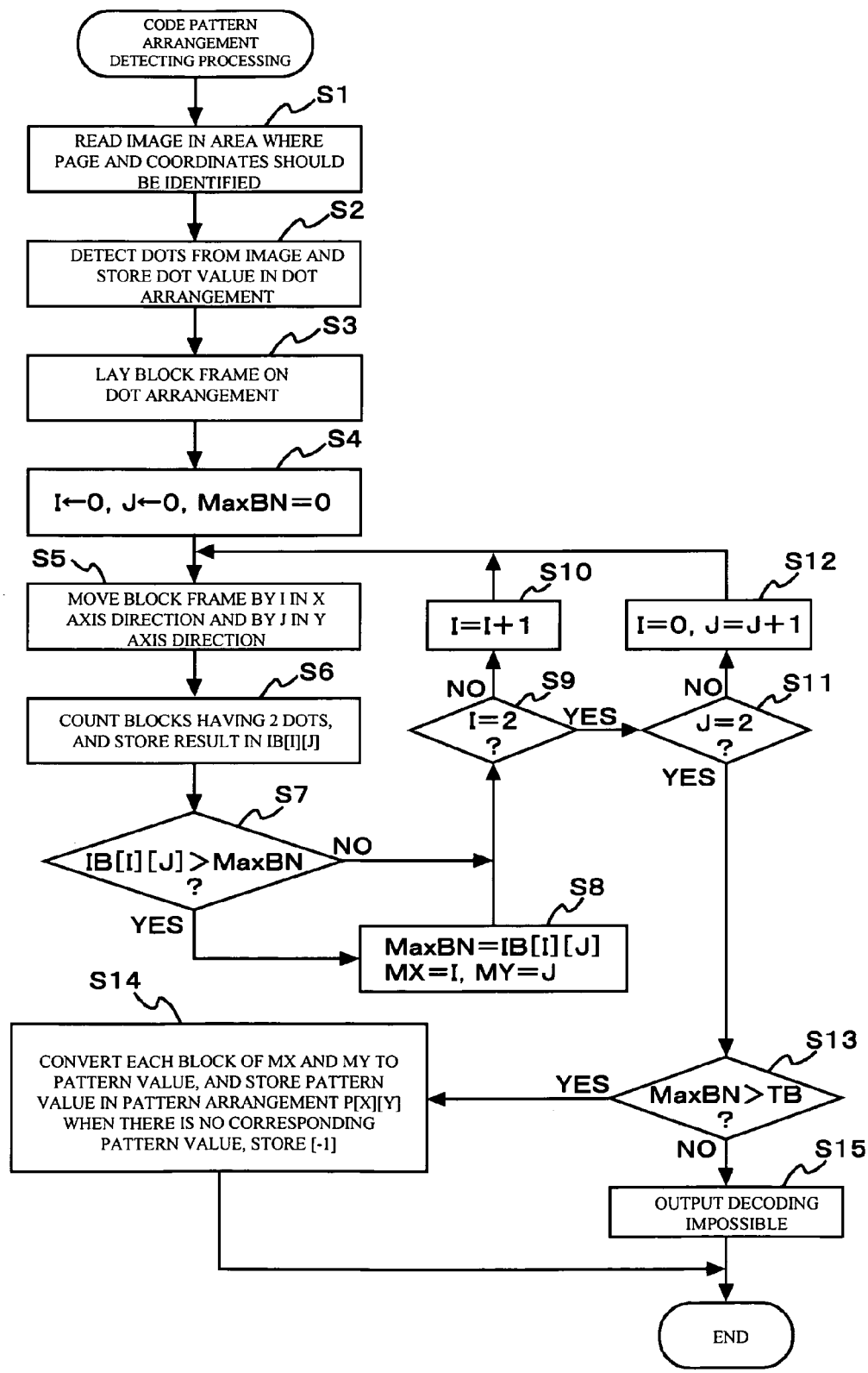
FIG. 32 is a flowchart showing a procedure for detecting an arrangement of code patterns.

Next, with reference to the flowchart shown in FIG. 32, a processing procedure of the dot alignment detecting section 22 and the block frame detecting section 23 will be described. First, an image in the area where a page and coordinates should be identified is read by the image reading apparatus 21 (step S1). Next, the dot alignment detecting section 22 detects dots from the image, and stores coordinate information of positions where the dots are detected in a dot arrangement storing section of the memory (step S2). For the size of the dot arrangement, a size which includes the number of blocks necessary for decoding and the number of dots obtained by subtracting 1 from the number of dots of one side of a block is necessary. Therefore, in the present exemplary embodiment, since the number of blocks necessary for decoding is 15×15 and one side of a block includes 3 dots, a dot arrangement of 17×17 should be stored.

Next, a block frame is superimposed on the dot arrangement showing the positions of the detected dots (step S3). As shown in FIG. 15, the block frame becoming a decoding unit is superimposed on the data showing the dot positions. In the present exemplary embodiment, a 5×5 block frame is used. Then, the initial value 0 is set for counters I and J, and 0 is set for MaxBN (step S4). The counters I and J count the number of steps by which the block frame is moved from the initial position. As the block frame is moved for every line of the image, the number of the lines by which the block frame is moved is counted by the counters I and J. The position of superimposing the block frame on the data may be a given position. Even if the reading position is misaligned, the codes representing a page number are repeatedly reproduced and therefore interpolation can be made to decode the page number. Further, blocks representing coordinate values in the X axis direction and the Y axis direction are always included in one block frame. MaxBN records the maximum count value obtained when the number of blocks in which the number of dots detected in the block becomes 2 is counted while the block frame is moved.

Next, the block frame is moved by I in the X axis direction, and moved by J in the Y axis direction (step S5). Since I and J are set to 0 as the initial value, the block frame is not moved. Then, the number of dots included in each block of the block frame is counted, and the number of blocks in which the number of dots becomes 2 is counted. The counted number of blocks is stored in a register of IB[I] [J] (step S6). In the [I] and [J] of IB[I] [J], values of I and J representing movement amounts of the block frame are respectively recorded.

Next, IB[I] [J] is compared to MaxBN (step S7). Since MaxBN is set to 0 as the initial value, IB[I][J] is larger than MaxBN in the first comparison (step S7/YES) When IB [I] [J] is larger than MaxBN (step S7/YES), the value of IB[I] [J] is registered as MaxBN. The value of I is regarded as MX, and the value of J is regarded as MY (step S8).

Next, it is determined whether or not I is 2 (step S9) When it is determined I is not 2 (step S9/NO), the value of I is increased by 1 (step S10). Then, processing of steps S5 and S6 is repeated, and IB[I] [J] is compared with MaxBN (step S7). When IB[I] [J] is larger than MaxBN which is the previous IB[ ] [J] (step S7/YES), IB[I] [J] is registered as MaxBN. The value of I then is regarded as MX, and the value of J then is regarded as MY (step S8). When MaxBN is larger than IB[I] [J] (step S7/NO), it is determined whether or not the value of I is 2 (step S9) When it is determined that I is 2 (step S9/YES), next, it is determined whether or not the value of J is 2 (step S11). When it is determined that J is not 2 (step S11/NO), the value of I is reset to 0, and the value of J is increased by 1 (step S12). Such steps are repeated, and the maximum IB[I][J] is detected among from (I=0, J=0) to (I=2, J=2).

Processing up to judging I=2 and J=2 is finished (step S11/YES), the stored MaxBN is compared to a determined threshold value TB (step S13). The determined threshold value TB is a threshold value used for judging whether or not the number of blocks in which the number of dots is 2 is larger than the previously set threshold value. When the MaxBN value is smaller than the determined threshold value, it is determined that noise of the image is large and thus decoding is not possible, and decoding impossible is outputted (step S15). When MaxBN exceeds the judgment threshold value (step S13/YES), the block frame is fixed in the position of MX and MY, at which position code patterns of each block are detected, which are converted to corresponding pattern values. The pattern values are recorded in the memory as P[X][Y] together with variables X and Y for identifying each block. When the detected code pattern can be converted into the corresponding pattern value, [−1] is recorded instead of the pattern value (step S14).

Figure 33:
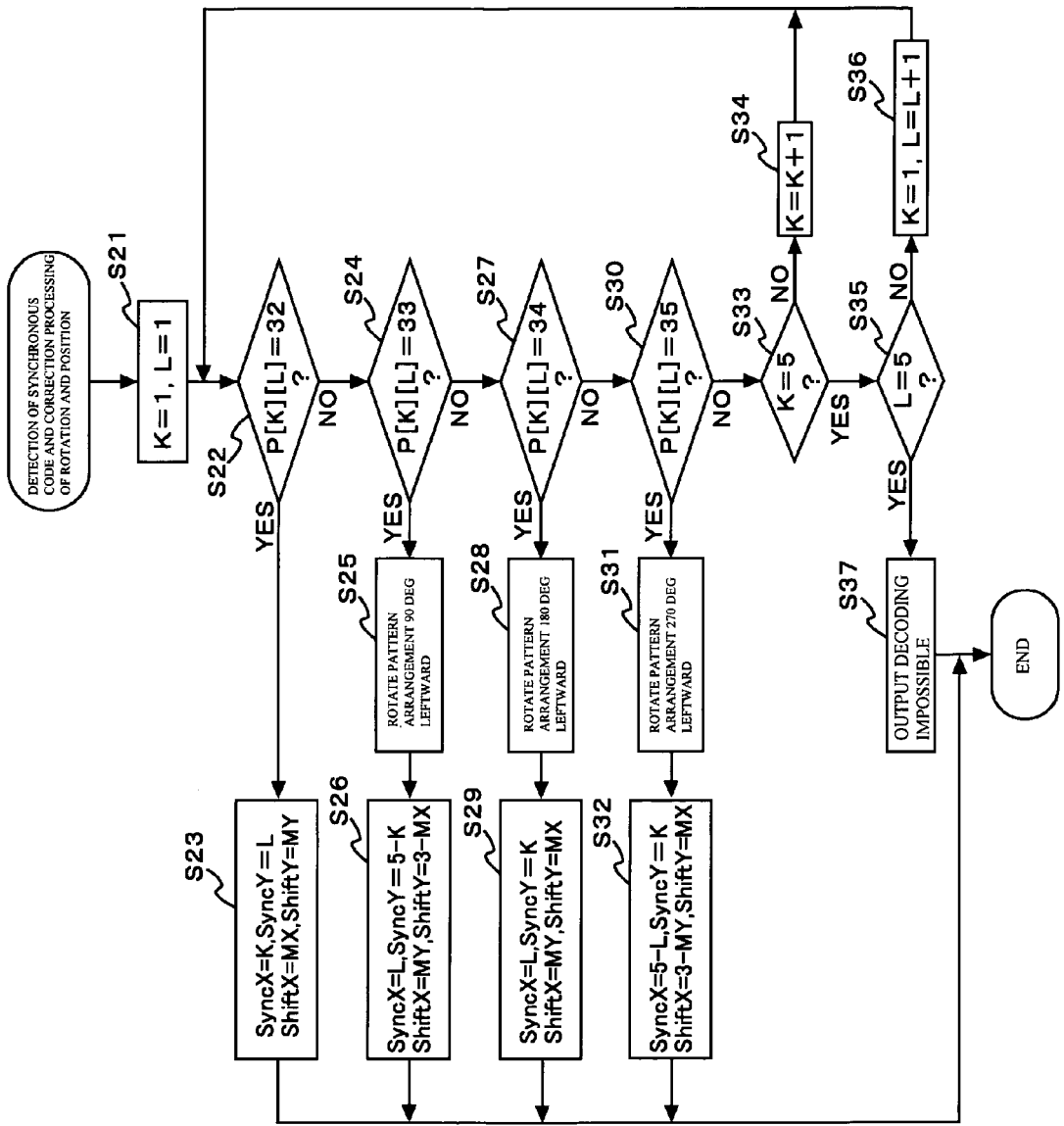
FIG. 33 is a flowchart showing a procedure of detecting a synchronous code and rotating a code pattern.

Next, with reference to the flowchart shown in FIG. 33, correction processing in which a synchronous code is detected and an image is rotated in a correct direction will be described. Such processing is performed by the image rotation judging section 24 and the bit information rotating/converting section 26. First, values of K and L are set to 1 (step S21). K is a variable representing a block number in the X axis direction. L is a variable representing a block number in the Y axis direction. Next, it is determined whether or not a pattern value of P [K] [L] is 32 (step S22). In the present exemplary embodiment, as a synchronous code, the code pattern with the pattern value 32 is used, and therefore a block thereof is searched.

When the block in which the pattern value of P[K] [L] is 32 is detected (step S22/YES), it is determined that it is not necessary to rotate the code pattern, and the X coordinate and the Y coordinate of the block in which the synchronous code is located are regarded as K and L. Further, the number of lines representing a movement amount of the block frame (ShiftX, ShiftY) is regarded as (MX, MY) (step S23).

Next, when a block in which the pattern value of P[K] [L] is 33 is detected (step S24/YES), the code pattern is rotated 90 degrees leftward (step S25). As shown in FIG. 16, the code pattern with the pattern value 33 is an image obtained by rotating the code pattern with the pattern value 32 rightward 90 degrees. Therefore, the code pattern with the pattern value 33 is rotated 90 degrees in the opposite direction (step S25). Further, according to the rotation, the X coordinate and the Y coordinate of the block in which the synchronous code is located are regarded as L and 5-K. Further, the number of lines representing a movement amount of the block frame (ShiftX, ShiftY) is regarded as (MY, 3-MX) (step S26).

Next, when a block in which the pattern value of P[K] [L] is 34 is detected (step S27/YES), the code pattern is rotated 180 degrees leftward (step S28). As shown in FIG. 16, the code pattern with the pattern value 34 is an image obtained by rotating the code pattern with the pattern value 32, 180 degrees. Therefore, the code pattern with the pattern value 34 is rotated 180 degrees (step S28). Further, according to the rotation, the X coordinate and the Y coordinate of the block in which is the synchronous code is located are regarded as L and K. Further, the number of lines representing a movement amount of the block frame (ShiftX, ShiftY) is regarded as (MY, MX) (step S29).

Next, when a block in which the pattern value of P[K] [L] is 35 is detected (step S30/YES), the code pattern is rotated 270 degrees leftward (step S31). As shown in FIG. 16, the code pattern with the pattern value 35 is an image obtained by rotating the code pattern with the pattern value 32 rightward 270 degrees. Therefore, the code pattern with the pattern value 35 is rotated 270 degrees leftward (step S31). Further, according to the rotation, the X coordinate and the Y coordinate of the block in which the synchronous code is located are regarded as 5-L and L. Further, the number of lines representing a movement amount of the block frame (ShiftX, ShiftY) is regarded as (3-MY, MX) (step S32).

The above-described processing is repeated until the block having the pattern value 32, 33, 34, or 35 is detected while the values of K and L are changed (steps S34 and S36). Further, if K=5 and L=5 are obtained (steps S33/YES and S35/YES), in the case that the block with the pattern value 32, 33, 34, or 35 cannot be detected, a determination signal of decoding impossible is outputted (step S37).

Figure 34:
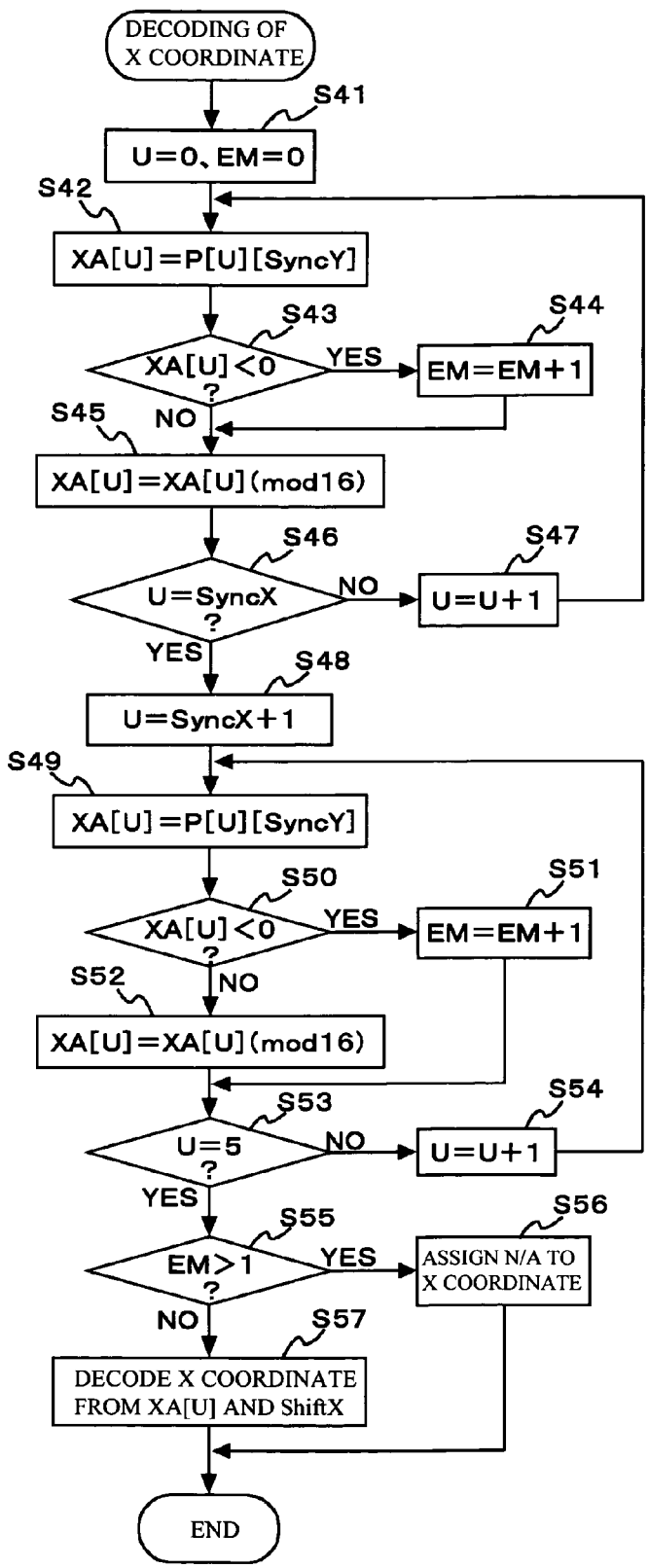
FIG. 34 is a flowchart showing a procedure of decoding a page number.

Next, with reference to the flowchart shown in FIG. 34, a processing procedure of detecting and decoding an X coordinate code will be described. The processing is performed by the X coordinate code detecting section 32 and the X coordinate decoding section 33. First, a variable U for counting a block number in the X axis direction of a block frame is set to 0. A counter EM which counts the number of blocks determined as an error among the blocks representing a page number is set to 0 (step S41).

Next, a corresponding code pattern is obtained from the code pattern storing section in the memory. Here, a code pattern of a number meeting P[U] [SyncY] is obtained, which is set as XA[U] (step S42). Here, a synchronous code SyncY is also a variable which can be 0, 1, 2, 3, or 4. The block at the far left in the Y axis direction is regarded as the 0th block, and the block at the far right in the Y axis direction is regarded as the fourth block. As shown in FIG. 13, a block representing the X coordinate is a block having the same value as the synchronous code block in the Y coordinate direction. Therefore, a pattern value of P[U] [SyncY] is obtained from the memory, which is set to XA[U].

When the pattern value of P[U] [SyncY] is obtained (step S42), the pattern value is regarded as the XA[U]th pattern value, and it is determined whether or not the pattern value exceeds 0 (step S43). Here, by comparing the pattern value of XA[U] read from the memory to 0, it is determined whether or not the code pattern is normally pattern-judged. When the pattern value is smaller than 0 (Step S43/YES), the counter EM counting the number of blocks determined as an error is incremented by 1 (step S44). Meanwhile, when the pattern value is not smaller than 0 (Step S43/NO), the remainder obtained by dividing P[U] [SyncY] by 16 is stored as the XA[U]th pattern value (step S45). Next, it is determined whether or not the value of U becomes equal to SyncX (step S46). This processing is performed in order to omit the pattern of the block representing the synchronous code from patterns representing the X coordinate value. When the value of U is not equal to SyncX (step S46/NO), the value of U is increased by 1 (step S47), and processing of steps S42 to S46 is repeated. When the value of U becomes equal to SyncX (step S46/YES), SyncX+1 is set to U in order to skip the block of the synchronous code (step S48).

Next, a pattern value of P[SyncX+1] [SyncY] is obtained from the memory, and is set to XA[U] (step S49). After that, in the similar fashion as the above-described procedure, by comparing the pattern value of XA[U]read from the memory to 0, it is determined whether or not the code pattern is normally determined pattern (step S50). When the pattern value is smaller than 0 (Step S50/YES), the counter EM counting the number of blocks determined as an error is incremented by 1 (step S51). Meanwhile, when the pattern value is not smaller than 0 (Step S50/NO), the remainder obtained by dividing P[U] [SyncY] by 16 is stored as the XA[U]-th pattern value (step S52). After that, it is determined whether or not the value of U becomes "5" (step S53). When the value of U is not 5 (step S53/NO), the value of U is increased by 1 (step S54), and processing of steps S49 to S54 is repeated. When the value of U becomes 5 (step S53/YES), it is determined whether or not the value of EM is larger than 1 (step S55). In the present exemplary embodiment, the number of errors allowable in decoding the X coordinate is set to 1. However, the number of errors allowable is not limited thereto. The number of errors allowable can be voluntarily set according to the coding method. When the number of errors is larger than 1 (step S55/YES), it is determined that error occurrence frequency is high, and normal coding cannot be performed, and N/A (not applicable) is outputted to the X coordinate (step S56). When the value of the counter EM is smaller than 1 (step S55/NO), the X coordinate is decoded from XA[U] and siftX (step S57). Then, when the number of errors is 1, decoding is enabled by using the remaining 3 blocks, and the error 1 block can be corrected. The corrected value is stored in an appropriate place of P[X] [Y].

Since a procedure of decoding the Y coordinate is performed in the similar procedure as decoding the X coordinate, detailed descriptions thereof will be omitted.

Figure 35:
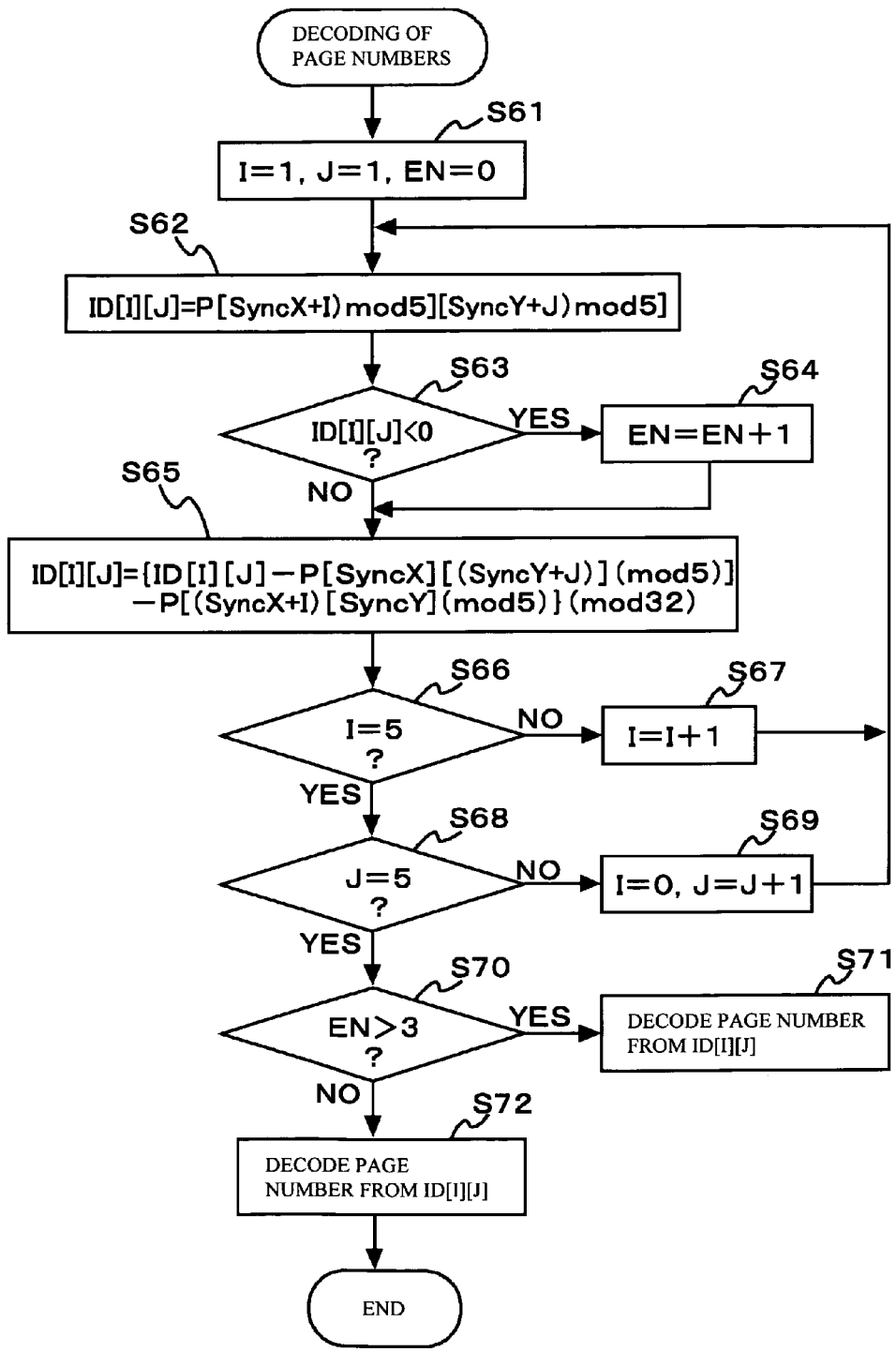
FIG. 35 is a flowchart showing a procedure of decoding an X coordinate.

Next, with reference to the flowchart shown in FIG. 35, a processing procedure in which code patterns representing a page number are detected, the code patterns are sorted in numerical order, and the code patterns are decoded will be described. The processing is performed by the code detecting section 27, the page code restoring section 28, and the page number decoding section 29. First, variables I and J for identifying each block of a 5×5 block frame are set to 1. A counter EN for counting the number of blocks determined as an error among the blocks representing a page number is set to 0 (step S61). Here, I is a variable counting the block number in the X axis direction. J is a variable counting the block number in the Y axis direction.

Next, a corresponding code pattern is obtained from the code pattern storing section in the memory. Here, a code pattern with a number that satisfies P[(SyncX+I)(mod 5)] [(SyncY+J) (mod 5)] is obtained, which is set as ID[I] [J] (step S42). Here, a synchronous code SyncX is a variable which can be 0, 1, 2, 3, or 4. The block at the far left in the X axis direction is regarded as the 0th block, and the block at the far right in the X axis direction is regarded as the fourth block. For example, as shown in FIG. 28C, a description will be given of a case where a synchronous code is located in the third block from the left in the X axis direction and located in the second block from the top in the Y axis direction within the block frame. Code patterns representing a page number start from the block located lower right from the synchronous code. Therefore, the block which is the fourth block from the left in the X axis direction and is the third block from the top in the Y axis direction becomes the first block representing a page number. Therefore, when the block where the synchronous code is located (SyncX) is added with I and the result is divided by 5, the remainder thereof becomes a value representing the block in the X axis direction. Similarly, when the block where the synchronous code is located (SyncY) is added with J and the result is divided by 5, the remainder thereof becomes a value representing the block in the Y axis direction.

When the pattern value of P[(SyncX+S)(mod 5)][(SyncY+L) (mod 5)] is obtained (step S42), the pattern value is regarded as the ID[I] [J]-th pattern value, and it is determined whether or not the pattern value exceeds 0 (step S43). In the step S14 in the flowchart shown in FIG. 31, when the detected code pattern cannot be converted into the corresponding pattern value, [−1] is recorded. Therefore, by comparing the pattern value of ID[I] [J] read from the memory to 0, it is determined whether or not the code pattern is normally determined pattern. When the pattern value is smaller than 0 (Step S63/YES), the counter EN counting the number of blocks determined as an error is incremented by 1 (step S64). Meanwhile, when the pattern value is smaller than 0 (Step S63/NO), the remainder obtained by dividing the result obtained by subtracting P[SyncX] [(SyncY+J) (mod 5)] and P[(SyncX+I) (mod 5)] [SyncY] from P[(SyncX+I) (mod 5)] [(SyncY+J) (mod 5)] by 32 is set to the ID[I] [J]-th pattern value (step S65).

Next, it is determined whether or not the value of I is 5 (step S66). When the value of I is not 5 (step S66/NO), the value of I is incremented by 1 (step S67), and processing of steps S62 to S65 is repeated until the value of I becomes 5. Further, when the value of I becomes 5 (step S66/YES), it is determined whether or not the value of J is 5 (step S68). When the value of J is not 5 (step S68/NO), the value of I is set to 1, the value of J is incremented by 1 (step S69), and processing of steps S62 to S65 is repeated. The above-described processing (processing in steps S62 to S69) is repeated until the values of I, J becomes 5. When the values of I, J become 5 (step S68/YES), it is determined whether or not the value of the counter EN counting the number of errors is larger than 3 (step S70). In the present exemplary embodiment, the number of errors allowable in decoding a page is set to 3. However, the number of errors allowable is not limited thereto. The number of errors allowable can be voluntarily set according to the coding method. When the number of errors is larger than 3 (step S70/YES), it is determined that error occurrence frequency is high, and normal coding cannot be performed, and N/A (not applicable) is outputted to the page number (step S71). When the number of the counter EN is smaller than 3 (step S70/NO), the page number is decoded in the order of arrangement ID[I] [J] (I, J=0 to 4) (step S72).

A description has been given of exemplary embodiments of the present invention. However, the present invention is not limited thereto, and various modifications may be made within the scope of the invention. For example, while one block is set in the shape of a quadrangle in the above-described exemplary embodiment, other shape such as a circle and a polygon may be used.

An image generating method and an image processing method employed as aspects of the present invention is realized with a Central Processing Unit (CPU), Read Only Memory (ROM), Random Access Memory (RAM), and the like, by installing a program from a portable memory device or a storage device such as a hard disc device, CD-ROM, DVD, or a flexible disc or downloading the program through a communications line. Then the steps of program are executed as the CPU operates the program.

The above-described description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A printed material comprising:
a first coded pattern area repeatedly formed on a recording material as a background image, the first coded pattern area containing image identification information; and
a second coded pattern area recorded as a background image on the recording material, the second coded pattern area containing a coordinate value,
wherein:
the first coded pattern area and the second coded pattern area are provided to convey information about an image formed on the recording material;
the first coded pattern area is composed of a first plurality code blocks, each of the code blocks having one of a plurality of pattern configurations,
each of the pattern configurations has a corresponding numerical code value;
the numerical code values of the code blocks in the first coded pattern area are further encoded, and
the further encoding of the numerical code values of the code blocks in the first coded pattern area including at least (1) a first step of adding the numerical code value of each code block to a numerical code value obtained from a code block in the second coded pattern area and (2) a second step of replacing the numerical code value of the code block in the first coded pattern area with a numerical code value derived in part from the process of the first step.

2. The printed material according to claim 1,
wherein the second coded pattern area is composed of a second plurality of code blocks, each of the code blocks having one of the plurality of pattern configurations, and the numerical code values of the code blocks in the second coded pattern area are further encoded by adding a given numerical value to the numerical code value of each code block.

3. The printed material according to claim 1, wherein the pattern configuration in the first and second plurality of code blocks is an M-sequence code.

4. The printed material according to claim 1, wherein the first coded pattern area and the second coded pattern area are formed from a block unit with a given size, and
a plurality of the blocks with a given size are continuously set.

5. The printed material according to claim 1 further comprising a coded pattern of a synchronous code which becomes a reference when a coded pattern is identified,
wherein the coded pattern of a synchronous code is a pattern in which a dot arrangement does not correspond to that of another pattern when rotated.

6. The printed material according to claim 1, wherein the background image is formed as a code pattern in which a given number of a plurality of dots is selectively arranged in a given area.

7. An image generating apparatus comprising:
a first coding section that encodes image identification information by coding a first series of numerical values in a first series of code blocks, and encodes coordinate value information by coding a second series of numerical values in a second series of code blocks, the image identification information identifying an image formed on the recording material;
a second coding section that further encodes the image identification information in the first series of code blocks by replacing the numerical value in each of the first series of code blocks with a new numerical value obtained by adding the original numerical value to a corresponding numerical value from the second series of code blocks; and
an image forming section that further encodes the numerical values of each code block as a pattern configuration and forms the pattern configurations as a background image on the recording material.

8. An image processing apparatus comprising:
a reading section that reads an image on a recording material, the recording material having a first coded pattern area and a second pattern area embedded as background images, the first pattern area containing encoded image identification information, to identify an image formed on the recording material, and the second coded pattern area containing encoded coordinate value information, the first coded pattern area being composed of a first plurality code blocks, the second coded pattern area being composed of a second plurality of code blocks, each of the code blocks having one of a plurality of pattern configurations, and each of the pattern configurations having a corresponding numerical code value;
a detecting section that detects the pattern configurations contained in the first coded pattern area and the second coded pattern area;
a first decoding section that extracts the numerical values corresponding to the pattern configurations contained in the second coded pattern area and decodes the coordinate value information using the numerical values; and
a second decoding section that (1) extracts the numerical values corresponding to the pattern configurations contained the first coded pattern area, (2) extracts a series of original numerical values by performing a decoding process that contains at least the step of subtracting the numerical value of a corresponding code block in the second pattern area from each of the numerical values of the code blocks in the first coded pattern area, and (3) decodes the image identification information using the original numerical values.

9. An image generating method comprising:
coding image identification information, to identify an image formed on a recording material, and coordinate value information on the recording material;
obtaining a first numerical value corresponding to a first code block containing encoded coordinate value information;
obtaining a second numerical value from a second code block containing encoded image identification information;
obtaining a third numerical value by adding the first numerical value to the second numerical value;
replacing the first numerical value with the third numerical value; and
forming a background image on the recording material, the background image being a coded pattern made up of a plurality of code blocks, each code block containing one of a plurality of pattern configurations, each of the pattern configurations having a corresponding numerical code value, and the coded pattern containing the image identification information and the coordinate value information.

10. An image processing method comprising:
reading an image in which a first coded pattern area containing image identification information, to identify an image formed on a recording material, and a second coded pattern area containing coordinate value information are embedded as a background image on the recording material;
detecting pattern configurations contained in code blocks in the first coded pattern area and code blocks in the second coded pattern area;
extracting numerical values corresponding to the pattern configurations contained in the second coded pattern area;
decoding the coordinate value information using the numerical values obtained from the second coded pattern area;
extracting numerical values corresponding to the pattern configurations contained the first coded pattern area;
extracting a series of original numerical values by performing a decoding process that contains at least the step of subtracting the numerical value of a corresponding code block in the second pattern area from each of the numerical values of the code blocks in the first coded pattern area; and
decoding the image identification information using the original numerical values.

11. A computer readable medium storing a program causing a computer to execute a process for image generation, the process comprising;
coding image identification information, to identify an image formed on a recording material, and coordinate value information on the recording material;
obtaining a first numerical value corresponding to a first code block containing encoded coordinate value information;

obtaining a second numerical value from a second code block containing encoded image identification information;

obtaining a third numerical value by adding the first numerical value to the second numerical value;

replacing the first numerical value with the third numerical value; and forming a background image on the recording material, the background image being a coded pattern made up of a plurality of code blocks, each code block containing one of a plurality of pattern configurations, each of the pattern configurations having a corresponding numerical code value, and the coded pattern containing the image identification information and the coordinate value information.

12. A computer readable medium storing a program causing a computer to execute a process for image processing, the process comprising:

reading an image in which a first coded pattern area containing image identification information, to identify an image formed on a recording material, and a second coded pattern area containing coordinate value information are embedded as a background image on the recording material;

detecting pattern configurations contained in code blocks in the first coded pattern area and code blocks in the second coded pattern area;

extracting numerical values corresponding to the pattern configurations contained in the second coded pattern area;

decoding the coordinate value information using the numerical values obtained from the second coded pattern area;

extracting numerical values corresponding to the pattern configurations contained the first coded pattern area;

extracting a series of original numerical values by performing a decoding process that contains at least the step of subtracting the numerical value of a corresponding code block in the second pattern area from each of the numerical values of the code blocks in the first coded pattern area; and decoding the image identification information using the original numerical values.

* * * * *